(12) United States Patent
Dinh et al.

(10) Patent No.: US 12,354,312 B2
(45) Date of Patent: Jul. 8, 2025

(54) IMAGE ENCODING APPARATUS AND IMAGE DECODING APPARATUS BOTH USING ARTIFICIAL INTELLIGENCE, AND IMAGE ENCODING METHOD AND IMAGE DECODING METHOD PERFORMED BY THE IMAGE ENCODING APPARATUS AND THE IMAGE DECODING APPARATUS

(71) Applicant: SAMSUNG ELECTRONICS CO., LTD., Suwon-si (KR)

(72) Inventors: Quockhanh Dinh, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 430 days.

(21) Appl. No.: 17/983,843

(22) Filed: Nov. 9, 2022

(65) Prior Publication Data

US 2023/0145525 A1 May 11, 2023

Related U.S. Application Data

(63) Continuation of application No. PCT/KR2022/017530, filed on Nov. 9, 2022.

(30) Foreign Application Priority Data

Nov. 9, 2021 (KR) .................. 10-2021-0153308
Dec. 3, 2021 (KR) .................. 10-2021-0172264
Jul. 22, 2022 (KR) .................. 10-2022-0091316

(51) Int. Cl.
*G06T 9/00* (2006.01)
*G06T 3/4046* (2024.01)

(52) U.S. Cl.
CPC ............ *G06T 9/002* (2013.01); *G06T 3/4046* (2013.01)

(58) Field of Classification Search
CPC ......... G06T 9/002; G06T 3/4046; G06T 9/00; G06N 3/04; G06N 3/08; H04N 19/147;
(Continued)

(56) References Cited

U.S. PATENT DOCUMENTS 8,711,930 B2 4/2014 Karczewicz et al.
10,817,990 B1 * 10/2020 Yang .................... H04N 19/154
(Continued)

FOREIGN PATENT DOCUMENTS

CN 110933409 A 3/2020
KR 10-0984612 B1 9/2010
(Continued)

OTHER PUBLICATIONS

Agustsson et al., "Scale-space flow for end-to-end optimized video compression," CVPR, Jun. 2020, Total 10 pages.
(Continued)

*Primary Examiner* — Charles T Shedrick
(74) *Attorney, Agent, or Firm* — Sughrue Mion, PLLC

(57) ABSTRACT

An image decoding method using artificial intelligence (AI), including obtaining, from a bitstream, a current optical flow and correction data which are generated based on a current predicted image and a current image; obtaining the current predicted image based on a previous reconstructed image and the current optical flow; obtaining feature data of the current predicted image by applying the current predicted image to a neural network-based predicted image encoder; and obtaining a current reconstructed image corresponding to the current image by applying the correction data and the feature data of the current predicted image to a neural network-based image decoder.

20 Claims, 25 Drawing Sheets

(58) Field of Classification Search
CPC .... H04N 19/159; H04N 19/184; H04N 19/44; H04N 19/503; H04N 19/51; H04N 19/573
See application file for complete search history.

(56) References Cited

U.S. PATENT DOCUMENTS

| | | | |
|---|---|---|---|
| 10,825,140 B1 | 11/2020 | Yang et al. | |
| 11,159,789 B2 | 10/2021 | Kwong et al. | |
| 11,166,014 B2 | 11/2021 | Cho et al. | |
| 11,503,221 B2 | 11/2022 | Yang et al. | |
| 11,544,820 B2 | 1/2023 | Xu et al. | |
| 2003/0123738 A1 | 7/2003 | Frojdh et al. | |
| 2020/0236349 A1 | 7/2020 | Zhai et al. | |
| 2021/0044811 A1* | 2/2021 | Hodgkinson | H04N 19/136 |
| 2022/0014776 A1 | 1/2022 | Sethuraman et al. | |
| 2022/0046284 A1* | 2/2022 | Nishi | H04N 19/192 |
| 2022/0138904 A1 | 5/2022 | Kim et al. | |
| 2022/0182618 A1* | 6/2022 | Kim | H04N 19/176 |
| 2022/0377358 A1* | 11/2022 | Galpin | H04N 19/436 |
| 2024/0146937 A1* | 5/2024 | Panusopone | H04N 19/53 |

FOREIGN PATENT DOCUMENTS

| | | |
|---|---|---|
| KR | 10-1377883 B1 | 4/2014 |
| KR | 10-2020-0005403 A | 1/2020 |
| KR | 10-2020-0140096 A | 12/2020 |
| KR | 10-2021-0018850 A | 2/2021 |
| KR | 10-2244187 B1 | 4/2021 |
| KR | 10-2262832 B1 | 6/2021 |
| KR | 10-2271740 B1 | 7/2021 |
| KR | 10-2021-0122854 A | 10/2021 |
| KR | 10-2312338 B1 | 10/2021 |
| KR | 10-2021-0131894 A | 11/2021 |
| WO | 2020/169083 A1 | 8/2020 |

OTHER PUBLICATIONS

Lu et al., "DVC: An End-to-end Deep Video Compression Framework," CVPR, Jun. 2019, Total 10 pages.

Ma et al., "BVI-DVC: A Training Database for Deep Video Compression," arXiv:2003.13552v2 [eess.IV], Oct. 2020, Total 11 pages.

Wang et al., "MCL-JCV: A Jnd-Based H.264/AVC Video Quality Assessment Dataset," ICIP 2016, Sep. 2016, Total 5 pages.

Mentzer et al., "Towards Generative Video Compression," arXiv:2107.12038v1 [eess.IV], Jul. 2021, Total 19 pages.

Mentzer et al., "Neural Video Compression using GANs for Detail Synthesis and Propagation," arXiv:2107.12038v2 [eess.IV], Nov. 2021, Total 19 pages.

Balle et al., "Variational Image Compression With a Scale Hyperprior," ICLR 2018, arXiv: 1802.01436v2 [eess.IV], May 2018, Total 23 pages.

International Search Report (PCT/ISA210) issued on Feb. 20, 2023 from the International Searching Authority in International Application No. PCT/KR2022/017530.

Written Opinion (PCT/ISA/237) issued on Feb. 20, 2023 from the International Searching Authority in International Application No. PCT/KR2022/017530.

* cited by examiner

IMAGE ENCODING APPARATUS AND IMAGE DECODING APPARATUS BOTH USING ARTIFICIAL INTELLIGENCE, AND IMAGE ENCODING METHOD AND IMAGE DECODING METHOD PERFORMED BY THE IMAGE ENCODING APPARATUS AND THE IMAGE DECODING APPARATUS

CROSS-REFERENCE TO RELATED APPLICATIONS

This application is a continuation application of International Application No. PCT/KR2022/017530, filed on Nov. 9, 2022, which is based on and claims priority to Korean Patent Application No. 10-2021-0153308, filed on Nov. 9, 2021, Korean Patent Application No. 10-2021-0172264, filed on Dec. 3, 2021, and Korean Patent Application No. 10-2022-0091316, filed on Jul. 22, 2022, in the Korean Intellectual Property Office, the disclosures of which are incorporated by reference herein in their entireties.

BACKGROUND

1. Field

The disclosure relates to image encoding and decoding. More particularly, the disclosure relates to a technology for encoding and decoding an image by using artificial intelligence (AI), for example, a neural network.

2. Description of Related Art

Codecs such as H.264 advanced video coding (AVC) and high efficiency video coding (HEVC) may divide an image into blocks and predictively encode and decode each block through inter prediction or intra prediction.

Intra prediction is a method of compressing an image by removing spatial redundancy in the image, and inter prediction is a method of compressing an image by removing temporal redundancy between images.

A representative example of inter prediction is motion estimation coding. Motion estimation coding predicts blocks of a current image by using a reference image. A reference block that is the most similar to a current block may be found in a certain search range by using a certain evaluation function. The current block is predicted based on the reference block, and a prediction block generated as a result of the prediction is subtracted from the current block to generate a residual block. The residual block is then encoded.

To derive a motion vector indicating the reference block in the reference image, a motion vector of previously encoded blocks may be used as a motion vector predictor of the current block. A differential motion vector corresponding to a difference between a motion vector of the current block and the motion vector predictor of the current block is signaled to a decoder side through a certain method.

Recently, techniques for encoding/decoding an image by using artificial intelligence (AI) have been proposed, and a method for effectively encoding/decoding an image by using AI, for example, a neural network, is required.

SUMMARY

Provided are an image encoding apparatus, an image decoding apparatus, and an image encoding method and an image decoding method respectively performed by the image encoding apparatus and the image decoding apparatus, which prevent a bitrate of a bitstream from being unnecessarily increased by an optical flow including an artifact.

Provided are an image encoding apparatus, an image decoding apparatus, and an image encoding method and an image decoding method respectively performed by the image encoding apparatus and the image decoding apparatus, which improve the quality of a restored image by adaptively determining an encoding mode/decoding mode.

Provided are an image encoding apparatus, an image decoding apparatus, and an image encoding method and an image decoding method respectively performed by the image encoding apparatus and the image decoding apparatus, which provide an end-to-end encoding/decoding system.

In accordance with an aspect of the disclosure, an image decoding method using AI includes obtaining, from a bitstream, a current optical flow and correction data which are generated based on a current predicted image and a current image; obtaining the current predicted image based on a previous reconstructed image and the current optical flow; obtaining feature data of the current predicted image by applying the current predicted image to a neural network-based predicted image encoder; and obtaining a current reconstructed image corresponding to the current image by applying the correction data and the feature data of the current predicted image to a neural network-based image decoder.

The feature data of the current predicted image may be generated by the predicted image encoder based on a common feature included in the current image and the current predicted image, and the feature data of the current predicted image may not include high-frequency errors included in the current predicted image.

The correction data may be generated based on a feature which is included in the current image and which is not included in the current predicted image, by applying the current image and the current predicted image to a neural network-based image encoder.

The current optical flow may be obtained by applying feature data of the current optical flow obtained from the bitstream to a neural network-based optical flow decoder.

The image decoding method may further include obtaining a first modified predicted image by applying a first weight map to the current predicted image; and obtaining a second modified predicted image by applying a second weight map to the current predicted image, the obtaining of the feature data of the current predicted image may include obtaining feature data of the first modified predicted image by applying the first modified predicted image to the predicted image encoder, and the obtaining of the current reconstructed image may include applying the correction data and the feature data of the first modified predicted image to the image decoder; and obtaining the current reconstructed image by combining an image obtained from the image decoder with the second modified predicted image.

The first weight map and the second weight map may obtained by applying feature data of the current optical flow obtained from the bitstream to a neural network-based optical flow decoder.

The first weight map and the second weight map may be obtained by applying feature data of the current optical flow to a neural network-based weight decoder.

The first weight map and the second weight map may be obtained by applying feature data of a weight map obtained from the bitstream to a neural network-based weight decoder.

The image decoding method may further include determining a decoding mode of the current image, based on information obtained from the bitstream, wherein based on the decoding mode being a first mode, the current reconstructed image is obtained by applying the correction data and the feature data of the current predicted image to the image decoder, and wherein based on the decoding mode being a second mode, the current reconstructed image is obtained by combining an image obtained by applying the correction data to the image decoder with the current predicted image.

The information obtained from the bitstream may include at least one of a quantization parameter, a weight used to calculate a rate-distortion value, or information indicating the decoding mode.

In accordance with an aspect of the disclosure, a non-transitory computer-readable recording medium has recorded thereon instructions which, when executed by at least one processor, causes the at least one processor to: obtain, from a bitstream, a current optical flow and correction data which are generated based on a current predicted image and a current image; obtain the current predicted image based on a previous reconstructed image and the current optical flow; obtain feature data of the current predicted image by applying the current predicted image to a neural network-based predicted image encoder; and obtain a current reconstructed image corresponding to the current image by applying the correction data and the feature data of the current predicted image to a neural network-based image decoder.

In accordance with an aspect of the disclosure, an image encoding method using AI includes obtaining a current optical flow using a current image and a previous reconstructed image; generating a current predicted image based on the previous reconstructed image and the current optical flow; obtaining correction data by applying the current image and the current predicted image to a neural network-based image encoder; and generating a bitstream including feature data of the current optical flow and the correction data.

The image encoding method may further include determining an encoding mode corresponding to the current image, wherein based on the encoding mode being a first mode, the correction data is obtained by applying the current image and the current predicted image to the image encoder, and wherein based on the encoding mode being a second mode, the correction data is obtained by applying a residual image obtained based on the current image and the current predicted image to the image encoder.

A mode corresponding to a lower rate-distortion value from among a rate-distortion value of the first mode and a rate-distortion value of second mode may be determined as the encoding mode.

The encoding mode may be determined as the first mode or the second mode according to a result of comparing a bitrate of a bitstream obtained according to the first mode and a bitrate of a bitstream obtained according to the second mode.

The encoding mode may be determined as the first mode or the second mode according to a result of comparing a pre-determined value with a quantization parameter or a weight used to calculate a rate-distortion value.

The obtaining of the current optical flow may further include obtaining feature data of the current optical flow by applying the current image and the previous reconstructed image to a neural network-based optical flow encoder; and applying the feature data of the current optical flow to a neural network-based optical flow decoder.

The image encoding method may further include: obtaining a first modified predicted image by applying a first weight map to the current predicted image; and obtaining a second modified predicted image by applying a second weight map to the current predicted image, and the correction data may be obtained based on a residual image obtained based on the second modified predicted image and the current image and the first modified predicted image being applied to the image encoder.

The image encoding method may further include obtaining feature data of the current predicted image by applying the current predicted image to a neural network-based predicted image encoder, and the bitstream may further include the feature data of the current predicted image.

In accordance with an aspect of the disclosure, a non-transitory computer-readable recording medium has recorded thereon a instructions which, at least one processor, causes the at least one processor to: obtain a current optical flow using a current image and a previous reconstructed image; generate a current predicted image based on the previous reconstructed image and the current optical flow; obtain correction data by applying the current image and the current predicted image to a neural network-based image encoder; and generate a bitstream including feature data of the current optical flow and the correction data.

In accordance with an aspect of the disclosure, an image decoding apparatus using AI includes at least one processor configured to: obtain, from a bitstream, a current optical flow and correction data which are generated based on a current predicted image and a current image, obtain the current predicted image based on a previous reconstructed image and the current optical flow, obtain feature data of the current predicted image by applying the current predicted image to a neural network-based predicted image encoder, and obtain a current reconstructed image corresponding to the current image by applying the correction data and the feature data of the current predicted image to a neural network-based image decoder.

In accordance with an aspect of the disclosure, an image encoding apparatus using AI includes at least one processor configured to: obtain a current optical flow by using a current image and a previous reconstructed image, obtain correction data by applying the current image and a current predicted image generated based on the previous reconstructed image and the current optical flow to a neural network-based image encoder, and generate a bitstream including feature data of the current optical flow and the correction data.

In an image encoding apparatus, an image decoding apparatus, and an image encoding method and an image decoding method respectively performed by the image encoding apparatus and the image decoding apparatus, according to an embodiment of the disclosure, a bitrate of a bitstream may be prevented from being unnecessarily increased by an optical flow including an artifact.

In an image encoding apparatus, an image decoding apparatus, and an image encoding method and an image decoding method respectively performed by the image encoding apparatus and the image decoding apparatus, according to an embodiment of the disclosure, the quality of a restored image may be improved by adaptively determining an encoding mode/decoding mode.

In an image encoding apparatus, an image decoding apparatus, and an image encoding method and an image decoding method respectively performed by the image encoding apparatus and the image decoding apparatus, according to an embodiment of the disclosure, an artificial intelligence (AI)-based end-to-end encoding/decoding system may be provided.

DETAILED DESCRIPTION

Figure 1:
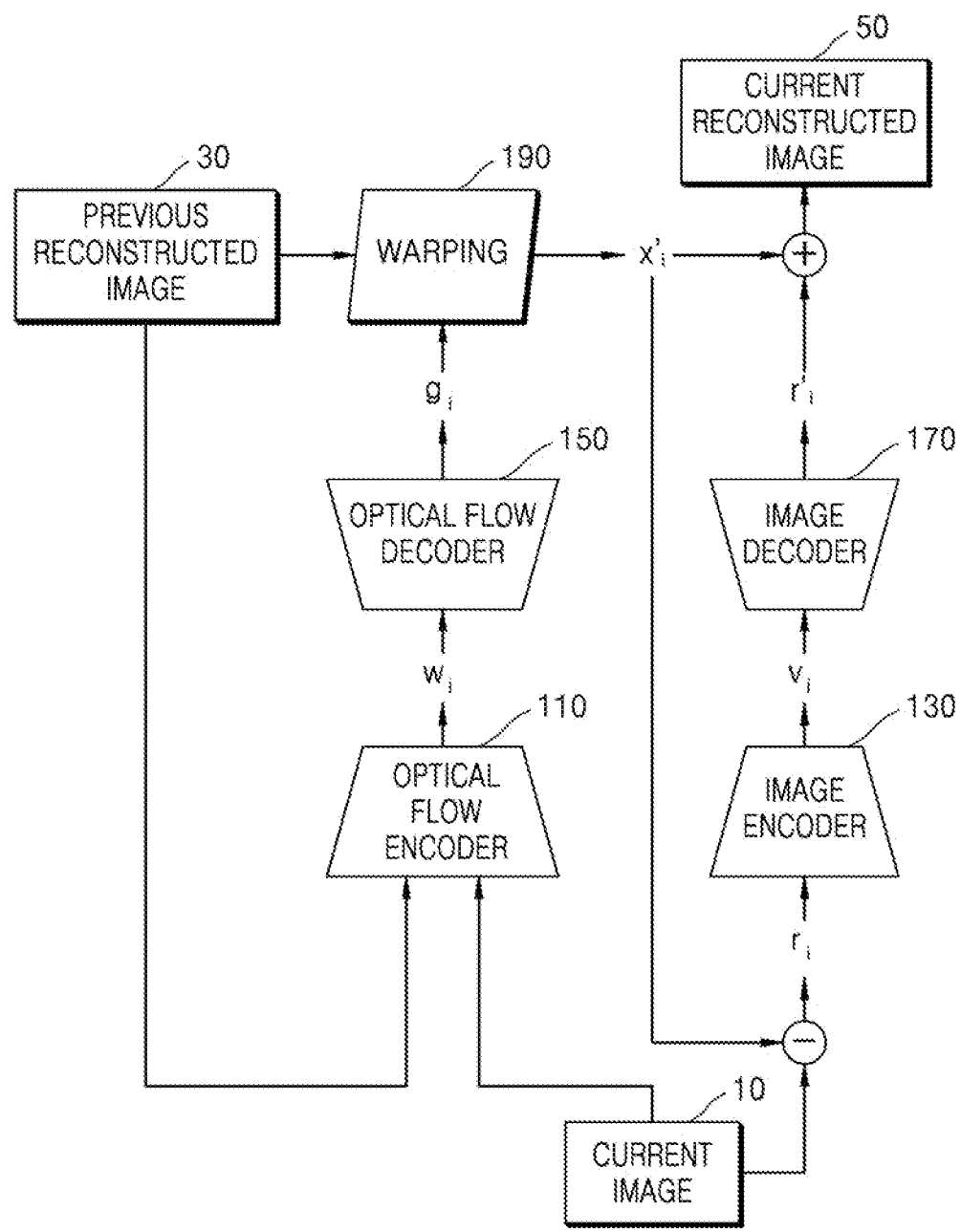
FIG. 1 is a diagram illustrating an image encoding and decoding process based on artificial intelligence (AI), according to embodiments.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description below, certain detailed explanations may be omitted when it is deemed that they may unnecessarily obscure the essence of the disclosure. While such terms as "first," "second," etc., may be used to describe various components, such components must not be limited to the above terms. The above terms are used only to distinguish one component from another.

Throughout the disclosure, the expression "at least one of a, b or c" indicates only a, only b, only c, both a and b, both a and c, both b and c, all of a, b, and c, or variations thereof.

When an element (e.g., a first element) is "coupled to" or "connected to" another element (e.g., a second element), the first element may be directly coupled to or connected to the second element, or, unless otherwise described, a third element may exist therebetween.

As is traditional in the field, embodiments may be described and illustrated in terms of blocks which carry out a described function or functions. These blocks, as shown in the drawings, which may be referred to herein as "units" or "modules" or the like, or by names such as encoder, decoder, obtainer, quantizer, transformer, subtractor, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' used herein may indicate a still image, a picture, a frame, a moving picture composed of a plurality of continuous still images, or a video.

A 'neural network' used herein may refer to a representative example of an artificial neural network model that mimics a brain nerve, and is not limited to an artificial neural network model using a specific algorithm. The neural network may also be referred to as a deep neural network.

A 'parameter' used herein, which may be a value used in a computation process of each layer included in a neural network, may be used, for example, when an input value is applied to a predetermined computational formula. The parameter, which may be a value set as a result of training, may be updated through separate training data according to need.

'Feature data' used herein may refer to data obtained by processing input data by a neural-network-based encoder. The feature data may be one-dimensional (1D) or two-dimensional (2D) data including a plurality of samples. The feature data may also be referred to as latent representation. The feature data may represent latent features of data output by a decoder described below.

A 'current image' used herein may refer to an image to be currently processed, and a 'previous image' used herein may refer to an image to be processed before the current image. A 'current optical flow' may refer to an optical flow obtained to process the current image.

A 'sample' used herein, which may be data assigned to a sampling location in an image, a feature map, or feature data, may refer to data that is to be processed. For example, the sample may include pixels in a 2D image.

FIG. 1 is a diagram illustrating an image encoding and decoding process based on artificial intelligence (AI).

FIG. 1 illustrates an inter prediction process. In inter prediction, an optical flow encoder 110, an image encoder 130, an optical flow decoder 150, and an image decoder 170 may be used.

The optical flow encoder 110, the image encoder 130, the optical flow decoder 150, and the image decoder 170 may be implemented as, by, or using neural networks.

The optical flow encoder 110 and the optical flow decoder 150 may be understood as neural networks for extracting a current optical flow $g_i$ from a current image 10 and a previous reconstructed image 30.

The image encoder 130 and the image decoder 170 may be neural networks for extracting feature data of an input image (e.g., a residual image $r_i$) and reconstructing an image from the feature data.

The image encoder 130 and the image decoder 170 may be distinguished from a predicted image encoder 350, an example of which is described below with reference to FIG. 3, extracting feature data from a current predicted image.

Inter prediction may be a process of encoding and decoding the current image 10 by using temporal redundancy between the current image 10 and the previous reconstructed image 30.

Position differences (or motion vectors) between blocks or samples in the current image 10 and reference blocks or reference samples in the previous reconstructed image 30 are used to encode and decode the current image 10. These position differences may be referred to as an optical flow. The optical flow may be defined as a set of motion vectors corresponding to samples or blocks in an image.

The optical flow, for example a current optical flow, may represent how positions of samples in the previous reconstructed image 30 have been changed in the current image 10, or where samples that are the same as, or similar to, the samples of the current image 10 are located in the previous reconstructed image 30.

For example, when a sample that is the same as or similar to, for example the most similar to, a sample located at (1, 1) in the current image 10 is located at (2, 1) in the previous reconstructed image 30, an optical flow or motion vector of the sample may be derived as (1(=2−1), 0(=1−1)).

In the image encoding and decoding process using AI, the optical flow encoder 110 and the optical flow decoder 150 may be used to obtain the current optical flow $g_i$ of the current image 10.

For example, the previous reconstructed image 30 and the current image 10 may be input to the optical flow encoder 110. The optical flow encoder 110 may output feature data $w_i$ of the current optical flow by processing the current image 10 and the previous reconstructed image 30 according to parameters which may be set as a result of training.

The feature data $w_i$ of the current optical flow may be input to the optical flow decoder 150. The optical flow decoder 150 may output the current optical flow $g_i$ by processing the input feature data $w_i$ according to the parameters set as a result of training.

The previous reconstructed image 30 may be warped via warping 190 based on the current optical flow $g_i$, and a current predicted image $x'_i$ may be obtained as a result of the warping 190. The warping 190 may be a type of geometric transformation for changing the positions of samples within an image.

The current predicted image $x'_i$ similar to the current image 10 may be obtained by applying the warping 190 to the previous reconstructed image 30 according to the current optical flow $g_i$ representing relative position relationships between the samples in the previous reconstructed image 30 and the samples in the current image 10.

For example, when a sample located at (1, 1) in the previous reconstructed image 30 is the most similar to a sample located at (2, 1) in the current image 10, the position of the sample located at (1, 1) in the previous reconstructed image 30 may be changed to (2, 1) through the warping 190.

Because the current predicted image $x'_i$ generated from the previous reconstructed image 30 is not the current image 10 itself, a residual image $r_i$ corresponding to a difference between the current predicted image $x'_i$ and the current image 10 may be obtained. For example, the residual image $r_i$ may be obtained by subtracting sample values in the current predicted image $x'_i$ from sample values in the current image 10.

The residual image $r_i$ may be input to the image encoder 130. The image encoder 130 may output feature data vi of the residual image $r_i$ by processing the residual image $r_i$ according to the parameters set as a result of training.

The feature data vi of the residual image $r_i$ may be input to the image decoder 170. The image decoder 170 may output a reconstructed residual image $r'_i$ by processing the input feature data vi according to the parameters set as a result of training.

A current reconstructed image 50 may be obtained by combining the current predicted image $x'_i$ generated by the warping 190 with respect to the previous reconstructed image 30 with the reconstructed residual image data $r'_i$.

When the image encoding and decoding process shown in FIG. 1 is implemented by an encoding apparatus and a decoding apparatus, the encoding apparatus may quantize the feature data $w_i$ of the current optical flow and the feature data vi of the residual image $r_i$ both obtained through the encoding of the current image 10, generate a bitstream including quantized feature data, and transmit the generated bitstream to the decoding apparatus. The decoding apparatus may obtain the feature data $w_i$ of the current optical flow and the feature data vi of the residual image $r_i$ by inversely quantizing the quantized feature data extracted from the bitstream. The decoding apparatus may obtain the current reconstructed image 50 by processing the feature data $w_i$ of the current optical flow and the feature data vi of the residual image $r_i$ by using the optical flow decoder 150 and the image decoder 170.

As described above, the residual image $r_i$ between the current image 10 and the current predicted image $x'_i$ may be input to the image encoder 130, and, because the current prediction image $x'_i$ is generated from the previous reconstructed image 30 based on the current optical flow $g_i$, when artifacts exist in the current optical flow $g_i$, artifacts are highly likely to also exist in the current predicted image $x'_i$ and the residual image $r_i$.

When the residual image $r_i$ having artifacts is input to the image encoder 130, the bitrate of the bitstream may unnecessarily increase. Moreover, because the current predicted image $x'_i$ having artifacts is combined with the reconstructed residual image $r'_i$, the quality of the current reconstructed image 50 may also deteriorate.

An example of a spread of artifacts from the current optical flow $g_i$ to the residual image $r_i$ is described below with reference to FIG. 2.

Figure 2:
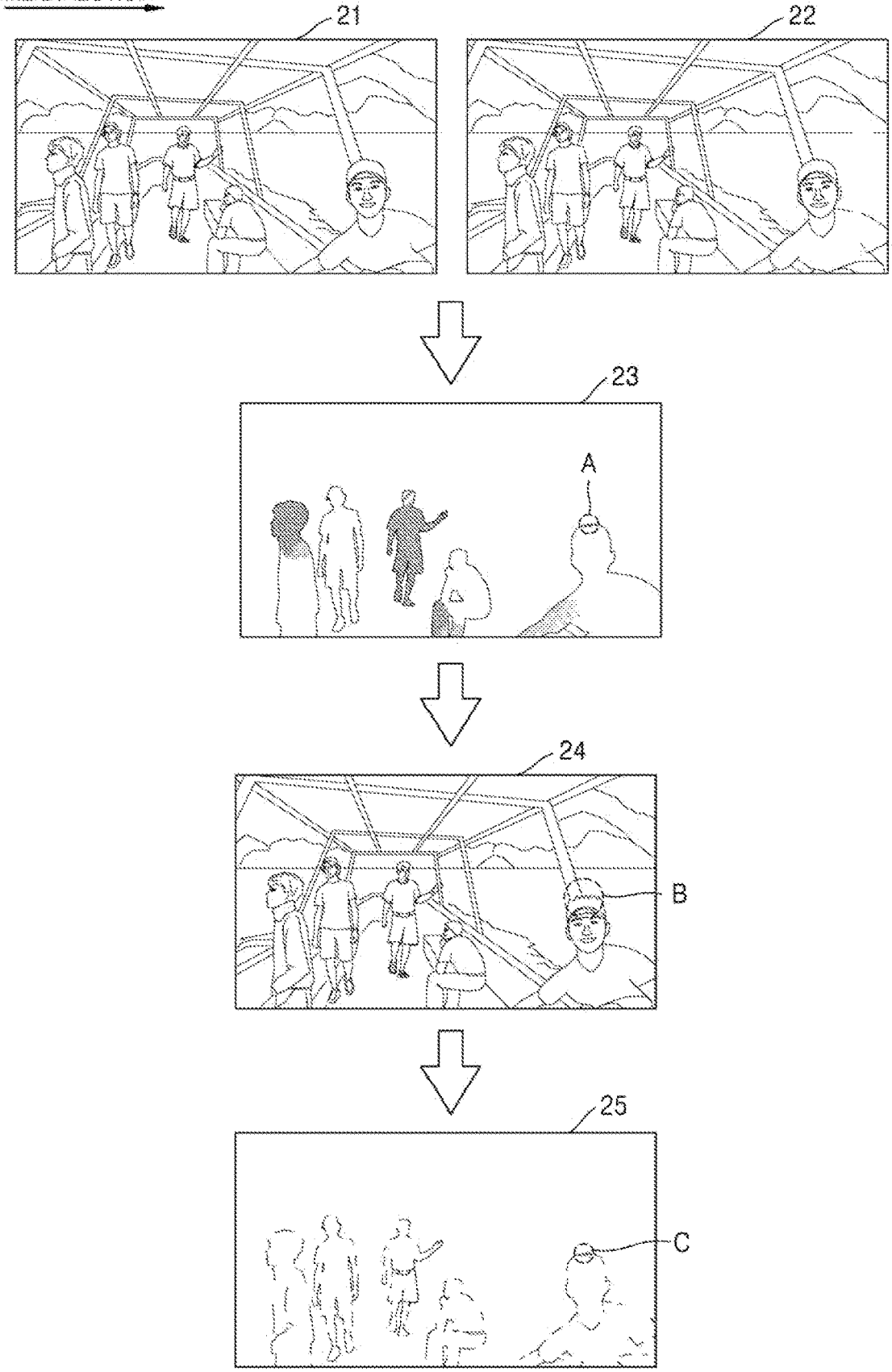
FIG. 2 is a view illustrating a current optical flow, a current predicted image, and a residual image obtained from a current image and a previous reconstructed image, according to embodiments.

FIG. 2 is a view illustrating a current optical flow 23, a current predicted image 24, and a residual image 25 obtained from a current image 22 and a previous reconstructed image 21.

Referring to FIG. 2, the current optical flow 23 indicating the motions of samples in the current image 22 may be obtained from the current image 22 and the previous reconstructed image 21.

As described above with reference to FIG. 1, the current optical flow 23 may be obtained through the processing by the optical flow encoder 110 and the optical flow decoder 150 and the quantization and inverse quantization of the feature data of the current optical flow, and thus artifacts may be generated in the current optical flow 23, for example, as shown for example in a region A.

As an example, artifacts may occur in the current optical flow 23 due to a limitation in the processing capabilities of the optical flow encoder 110 and the optical flow decoder 150. Because there may be a limit in the computational capabilities of the encoding apparatus and the decoding apparatus, the number of layers of the optical flow encoder 110 and the optical flow decoder 150 and the size of a filter kernel may also be limited. Therefore, because the optical flow encoder 110 and the optical flow decoder 150 may use limited capabilities to process the current image 22 and the previous reconstructed image 21, artifacts may occur in the current optical flow 23.

As another example, a quantization error may occur in the current optical flow 23 through quantization and inverse quantization of the feature data of the current optical flow 23. For example, when the value of a quantization parameter is increased to increase compression efficiency, the bitrate of the bitstream decreases, but the number of quantization errors increases.

As yet another example, when the movement of an object included in the current image 22 and the previous reconstructed image 21 is fast, the possibility that artifacts occur in the current optical flow 23 may increase.

When an artifact exists in the region A in the current optical flow 23, artifacts may also occur in a region B of the current predicted image 24 generated from the previous reconstructed image 21, based on the existence of artifacts in the region A, and artifacts may also occur in a region C of the residual image 25 obtained between the current predicted image 24 and the current image 22.

Because the residual image 25 is processed by the image encoder 130 and transformed into feature data of the residual image 25, and the feature data of the residual image 25 is included in a bitstream after undergoing a certain process, it may be seen that the artifacts present in the current optical flow 23 are delivered to the decoding apparatus.

In general, because artifacts may have high frequency characteristics, when the residual image 25 including artifacts is processed by the image encoder 130, the artifacts may cause an unnecessary increase in the bitrate of the bitstream.

An example of an image encoding and decoding process for preventing the spread of artifacts existing in a current optical flow is described below.

Figure 3:
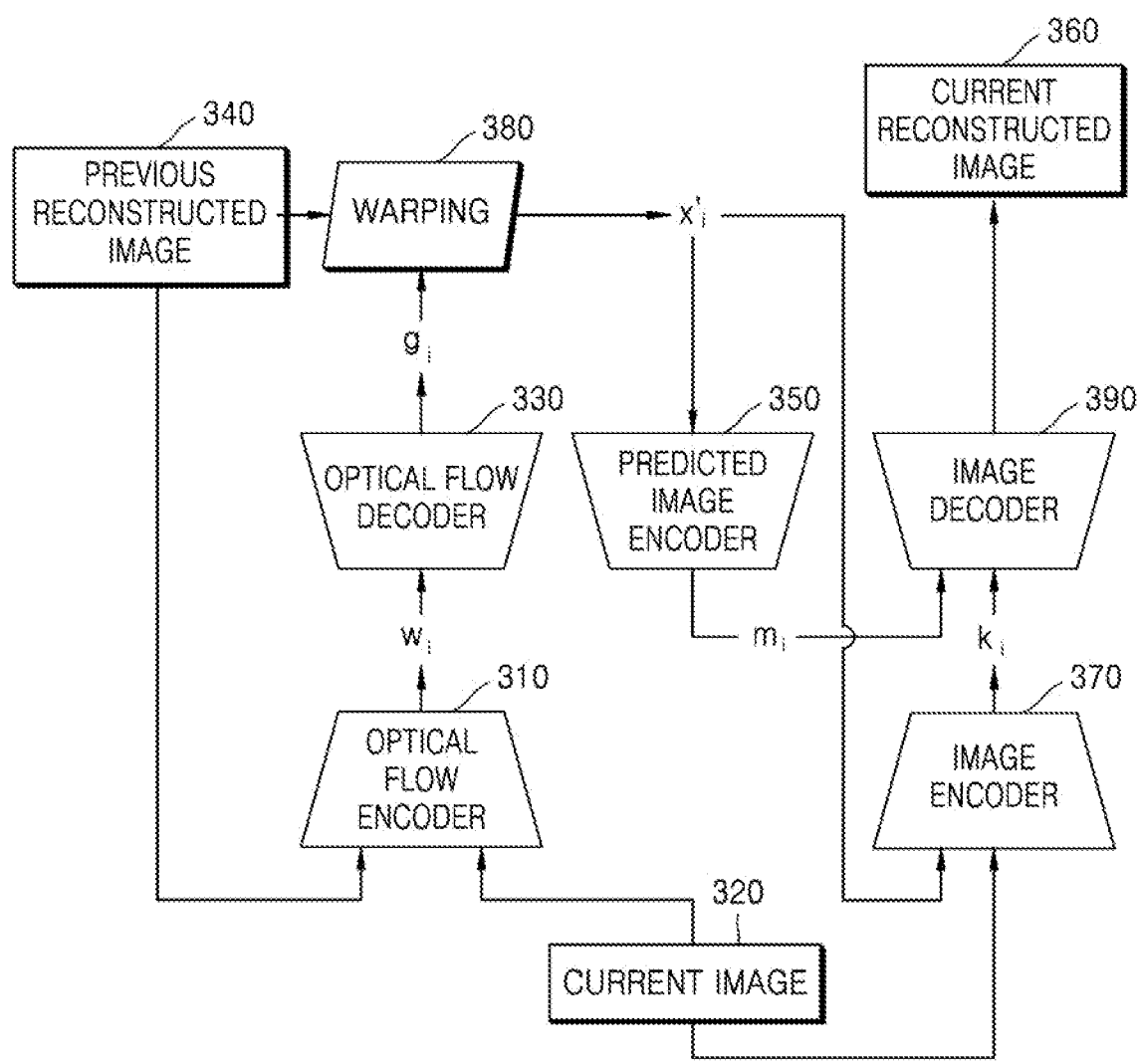
FIG. 3 is a diagram for describing an image encoding and decoding process according to embodiments.

FIG. 3 is a diagram for describing an image encoding and decoding process according to an embodiment of the disclosure.

Referring to FIG. 3, an optical flow encoder 310, an optical flow decoder 330, an image encoder 370, an image decoder 390, and a predicted image encoder 350 may be used to encode and decode an image.

Compared with FIG. 1, it may be seen that the predicted image encoder 350 is additionally used in the image encoding and decoding process shown in FIG. 3.

According to an embodiment of the disclosure, the optical flow encoder 310, the optical flow decoder 330, the image encoder 370, the image decoder 390, and the predicted image encoder 350 may be implemented as, by, or using neural networks.

To encode a current image 320, a previous reconstructed image 340 and the current image 320 may be input to the optical flow encoder 310. The optical flow encoder 310 may output feature data $w_i$ of a current optical flow by processing the current image 320 and the previous reconstructed image 340 according to parameters set as a result of training.

The feature data $w_i$ of the current optical flow may be input to the optical flow decoder 330. The optical flow decoder 330 may output a current optical flow $g_i$ by processing the input feature data $w_i$ according to the parameters set as a result of training.

The previous reconstructed image 340 may be warped via warping 380 based on the current optical flow $g_i$, and a current predicted image $x'_i$ may be obtained as a result of the warping 380.

The current predicted image $x'_i$ together with the current image 320 may be input to the image encoder 370. For example, a result of concatenating the current predicted image $x'_i$ with the current image 320 may be input to the image encoder 370. The concatenation may refer to a process of combining two or more pieces of feature data in a channel direction.

The image encoder 370 may output correction data $k_i$ by processing the current predicted image $x'_i$ and the current image 320 according to the parameters set as a result of training. The correction data $k_i$ may be feature data extracted from the current predicted image $x'_i$ and the current image 320.

According to an embodiment of the disclosure, the correction data $k_i$ may refer to data for correcting the current predicted image $x'_i$ the same as or similar to the current image 320 or correcting feature data $m_i$ of the current predicted image $x'_i$ so that the feature data $m_i$ of the current predicted image $x'_i$ has the features of the current image 320.

Separately from the current predicted image $x'_i$ being input to the image encoder 370, the current predicted image $x'_i$ may be input to the predicted image encoder 350.

The predicted image encoder 350 may output the feature data $m_i$ of the current predicted image $x'_i$ by processing the current predicted image $x'_i$ according to the parameters set as a result of training.

The feature data $m_i$ of the current predicted image $x'_i$ and the correction data $k_i$ may be input to the image decoder 390. For example, a result of concatenating the feature data $m_i$ of the current predicted image $x'_i$ with the correction data $k_i$ may be input to the image decoder 390.

According to an embodiment of the disclosure, in addition to the feature data $m_i$ of the current predicted image $x'_i$ and the correction data $k_i$, other feature data, for example, the feature data $w_i$ of the current optical flow, may also be input to the image decoder 390.

The image decoder 390 may obtain a current reconstructed image 360 by processing input data according to the parameters set as a result of training.

When the image encoding and decoding process shown in FIG. 3 is implemented by an encoding apparatus and a decoding apparatus, the encoding apparatus may generate a bitstream including the feature data $w_i$ of the current optical flow and the correction data $k_i$ both obtained through the encoding of the current image 320, and transmit the generated bitstream to the decoding apparatus.

The decoding apparatus may obtain the feature data $w_i$ of the current optical flow and the correction data $k_i$ from the bitstream. The decoding apparatus may obtain the current reconstructed image 360, based on the feature data $w_i$ of the current optical flow and the correction data kl.

Examples of differences between the image encoding and decoding process shown in FIG. 3, as compared with the image encoding and decoding process shown in FIG. 1 are described below.

First, in FIG. 1, the residual image $r_i$ corresponding to the difference between the current prediction image $x'_i$ and the current image 10 may be input to the image encoder 130, whereas, in FIG. 3, both the current prediction image $x'_i$ and the current image 320 may be input to the image encoder 370.

As described above, when an artifact is included in the current optical flow $g_i$, the artifact may also be included in the residual image $r_i$. In this case, in the process illustrated in FIG. 1, it may be seen that only the residual image $r_i$ including the artifact is input to the image encoder 130. However, according to the embodiment shown in FIG. 3, the current predicted image $x'_i$ including the artifact and the current image 320 without artifacts are both input to the image encoder 370. Accordingly, the image encoder 370 may not consider the artifact in the current predicted image $x'_i$ that is not included in the current image 320, when generating the correction data kl. In other words, because the artifact in the current predicted image $x'_i$ is not considered by the image encoder 370, the bitrate of a bitstream may be prevented from unnecessarily increasing.

As described below, encoders and decoders used for image encoding and decoding may be trained so that the bitrate of the bitstream is reduced and a difference between the current image 320 and the current reconstructed image 360 is reduced. Accordingly, the image encoder 370 may exclude an artifact in the current prediction image $x'_i$ that serves as a factor for increasing the bitrate of the bitstream but does not contribute to reducing the difference between the current image 320 and the current reconstructed image 360, when generating the correction data kl.

In embodiments, when no artifacts are included in the current predicted image $x'_i$, that is, when the current prediction image $x'_i$ and the current image 320 are very similar to each other, the image encoder 370 may generate the correction data $k_i$ by considering only features that do not exist in the current predicted image $x'_i$ among the features of the current image 320, in order to reduce the bitrate of the bitstream.

Second, in FIG. 1, the current predicted image $x'_i$ is combined with the reconstructed residual image $r'_i$, whereas, in the embodiment of FIG. 3, the current predicted image $x'_i$ is processed by the predicted image encoder 350 and the feature data $m_i$ of the current predicted image $x'_i$ obtained as a result of the processing is input to the image decoder 390.

Because the correction data $k_i$ is feature data output by processing the current predicted image $x'_i$ and the current image 320 by the image encoder 370, in order to match the domains of the current predicted image $x'_i$ and the correction data $k_i$ with each other, the predicted image encoder 350 may process the current predicted image $x'_i$ to output the feature data $m_i$ of the current predicted image $x'_i$.

The predicted image encoder 350 may serve to remove the artifact from the current predicted image $x'_i$, because the artifact in the current prediction image $x'_i$ does not contribute to improving the quality of the current reconstructed image 360 and thus the predicted image encoder 350 may be trained to remove the artifact in the current prediction image $x'_i$. Also, it will be understood that, in embodiments, the predicted image encoder 350 may extract only essential information necessary to obtain the current reconstructed image 360, excluding high-frequency error, from the current predicted image $x'_i$, and transmit it to the image decoder 390. It will also be understood that, in embodiments, the decoding apparatus may obtain features that only the current image 320 has from the bitstream (for example, from the correction data $k_i$ included in the bitstream), and obtain the current reconstructed image 360 by using common features between the current image 320 and the current predicted image $x'_i$ extracted from the predicted image encoder 350.

In the embodiment shown in FIG. 3, the artifact in the current predicted image $x'_i$ may be allowed to be removed by the predicted image encoder 350 and/or the image encoder 370, so that the bitrate of the bitstream is reduced and also the quality of the current reconstructed image 360 may be improved.

An example of an image decoding apparatus 400 and an image encoding apparatus 1300 according to an embodiment of the disclosure and operations thereof described in detail below with reference to FIGS. 4 through 21.

Figure 4:
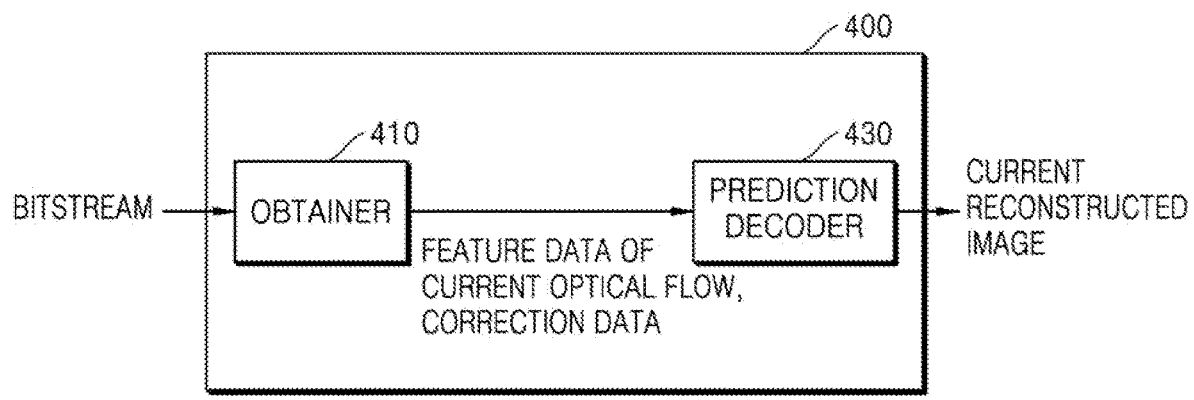
FIG. 4 is a block diagram of a structure of an image decoding apparatus according to embodiments.

FIG. 4 is a block diagram of a structure of the image decoding apparatus 400 according to an embodiment of the disclosure.

Referring to FIG. 4, the image decoding apparatus 400 may include an obtainer 410, which may be referred to as an obtaining module, and a prediction decoder 430.

The obtainer 410 and the prediction decoder 430 may be implemented as, by, or using processors. The obtainer 410 and the prediction decoder 430 may operate according to instructions stored in a memory.

Although the obtainer 410 and the prediction decoder 430 are individually illustrated in FIG. 4, in embodiments the obtainer 410 and the prediction decoder 430 may be implemented through one processor. In this case, the obtainer 410 and the prediction decoder 430 may be implemented as, by, or using a dedicated processor, or may be implemented through a combination of software and a general-purpose processor such as an application processor (AP), a central processing unit (CPU), or a graphics processing unit (GPU). The dedicated processor may include a memory for implementing an embodiment of the disclosure or a memory processing unit for using an external memory.

In embodiments, the obtainer 410 and the prediction decoder 430 may be configured by a plurality of processors. In this case, the obtainer 410 and the prediction decoder 430 may be implemented as, by, or using a combination of dedicated processors, or may be implemented through a combination of software and a plurality of general-purpose processors such as APs, CPUs, or GPUs.

The obtainer 410 may obtain a bitstream including a result of encoding a current image.

Figure 13:
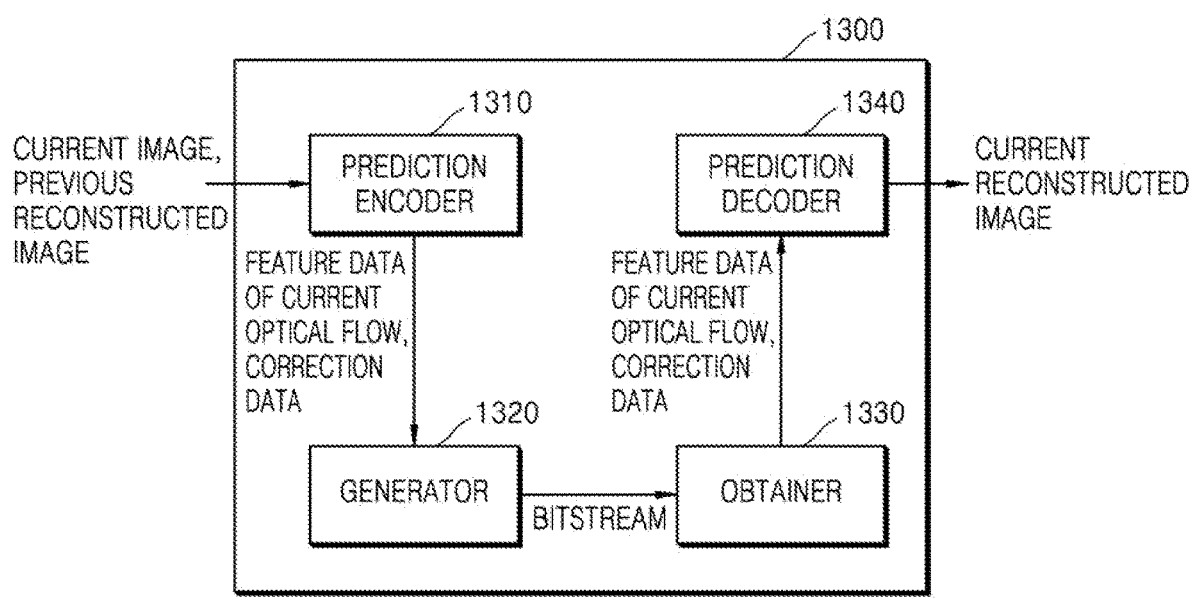
FIG. 13 is a block diagram of a structure of an image encoding apparatus according to embodiments.

The obtainer 410 may receive a bitstream from the image encoding apparatus 1300 of FIG. 13 through a network. According to an embodiment, the obtainer 410 may obtain the bitstream from a data storage medium including a magnetic medium (such as, a hard disk, a floppy disk, or a magnetic tape), an optical recording medium (such as, CD-ROM or DVD), or a magneto-optical medium (such as, a floptical disk).

The obtainer 410 may obtain feature data of a current optical flow and correction data by parsing the bitstream.

According to an embodiment of the disclosure, the obtainer 410 may obtain a first bitstream corresponding to the feature data of the current optical flow and a second bitstream corresponding to the correction data, and may obtain the feature data of the current optical flow and the correction data by parsing the first bitstream and the second bitstream, respectively.

The feature data of the current optical flow and the correction data may be transmitted to the prediction decoder 430, and the prediction decoder 430 may obtain a current reconstructed image corresponding to the current image by using the feature data of the current optical flow and the correction data. The current reconstructed image may be output to a display device to be reproduced.

Example operations of the obtainer 410 and the prediction decoder 430 are described in detail below with reference to FIGS. 5 through 11.

Figure 5:
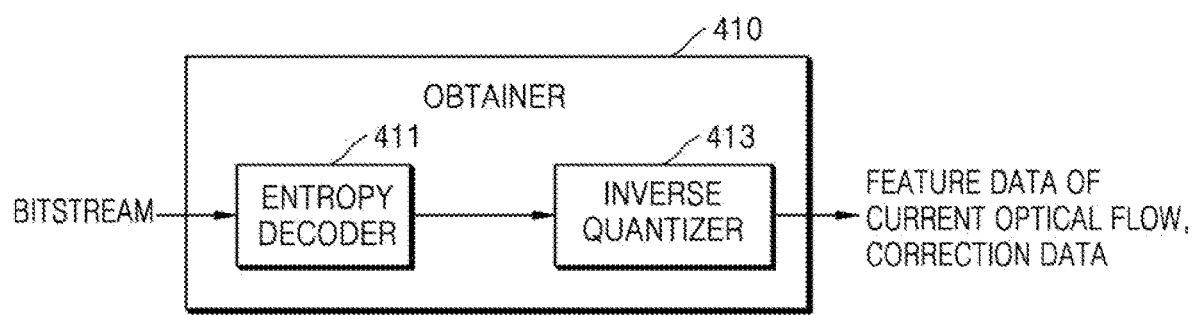
FIG. 5 is a block diagram of a configuration of an obtainer according to embodiments.

FIG. 5 is a block diagram of a configuration of the obtainer 410 of FIG. 4.

Referring to FIG. 5, the obtainer 410 may include an entropy decoder 411 and an inverse quantizer 413.

The entropy decoder 411 may obtain quantized feature data of the current optical flow and quantized correction data by entropy-coding bins included in the bitstream.

The inverse quantizer 413 may obtain the feature data of the current optical flow by inversely quantizing the quantized feature data of the current optical flow, and may obtain the correction data by inversely quantizing the quantized correction data.

According to an embodiment of the disclosure, the obtainer 410 may further include an inverse transformer. The inverse transformer may inversely transform the feature data and the correction data output by the inverse quantizer 413, from a frequency domain into a spatial domain. When the image encoding apparatus 1300, an example of which is described below, transforms the feature data of the current optical flow and the correction data from a spatial domain into a frequency domain, the inverse transformer may inversely transform the feature data and the correction data output by the inverse quantizer 413 from the frequency domain into the spatial domain.

According to an embodiment of the disclosure, the obtainer 410 may not include the inverse quantizer 413. In other words, the feature data of the current optical flow and the correction data may be obtained through processing by the entropy decoder 411.

According to an embodiment of the disclosure, the obtainer 410 may obtain the feature data of the current optical flow and the correction data only by inversely binarizing the bins included in the bitstream. This may be performed for a case in which the image encoding apparatus 1300 generates the bitstream by binarizing the feature data of the current optical flow and the correction data, for example, a case in which the image encoding apparatus 1300 does not apply entropy encoding, transformation, and quantization to the feature data of the current optical flow and the correction data.

Figure 6:
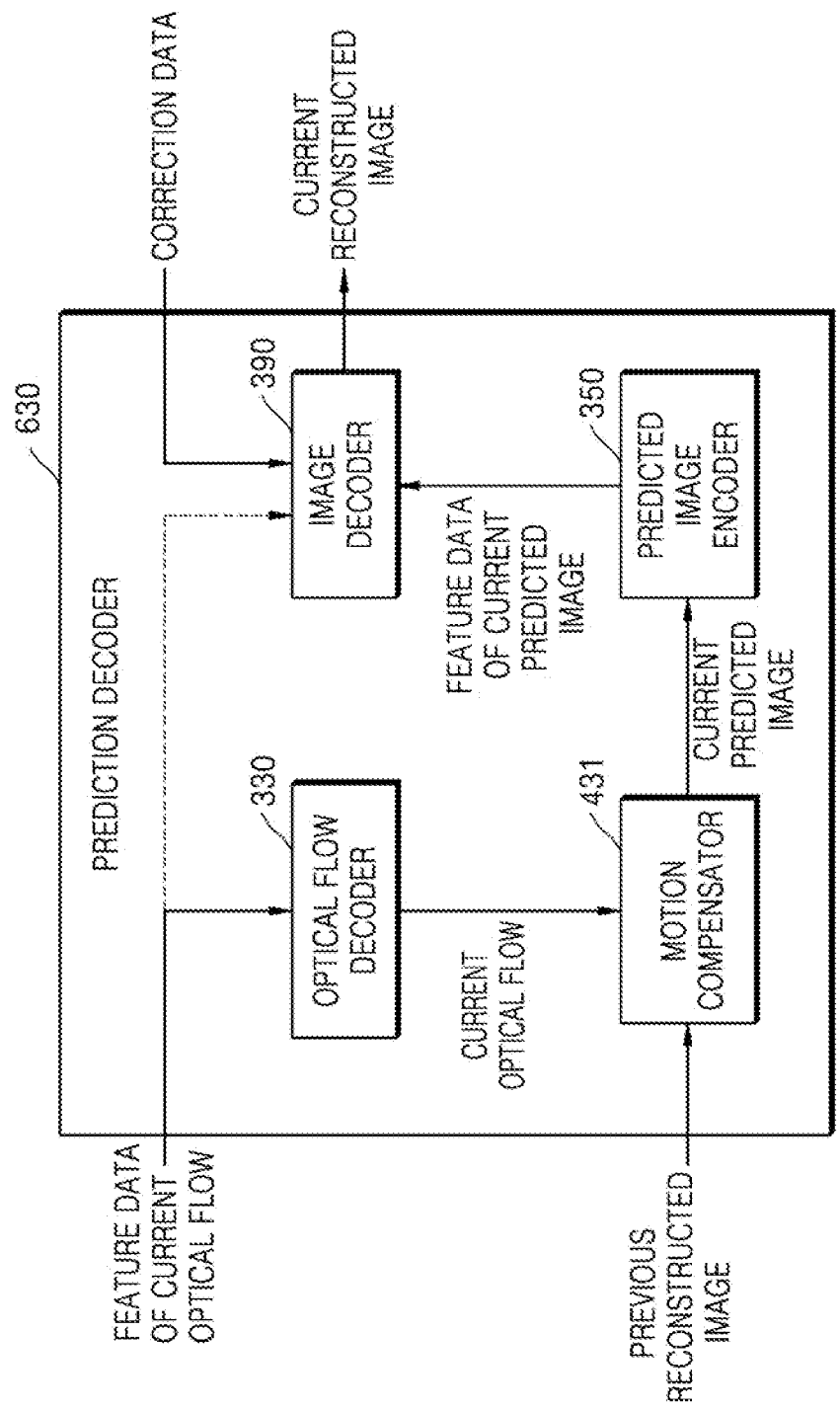
FIG. 6 is a block diagram of a configuration of a prediction decoder according to embodiments.

FIG. 6 is a block diagram of a configuration of a prediction decoder 630 according to an embodiment of the disclosure.

Referring to FIG. 6, the prediction decoder 630 may include an optical flow decoder 330, an image decoder 390, a motion compensator 431, and a predicted image encoder 350.

The optical flow decoder 330, the image decoder 390, and the predicted image encoder 350 may be implemented as, by, or using a neural network including one or more layers (e.g., a convolutional layer).

The optical flow decoder 330, the image decoder 390, and the predicted image encoder 350 may be stored in a memory. According to an embodiment of the disclosure, the optical flow decoder 330, the image decoder 390, and the predicted image encoder 350 may be implemented as, by, or using at least one dedicated processor for AI.

The feature data of the current optical flow output by the obtainer 410 may be input to the optical flow decoder 330.

The optical flow decoder 330 may obtain the current optical flow by processing the feature data of the current optical flow according to parameters set through training. The current optical flow, which is 1 D or 2D data, may include a plurality of samples. The current optical flow may be provided to the motion compensator 431.

The motion compensator 431 may generate a current predicted image similar to the current image by processing a previous reconstructed image according to the current optical flow. The previous reconstructed image is an image reconstructed by decoding a previous image supposed to be processed before the current image is processed.

The motion compensator 431 may warp the previous reconstructed image according to the current optical flow to generate the current predicted image. The warping for generating the current predicted image is merely an example, and the motion compensator 431 may perform various types of image processing for changing the previous reconstructed image, in order to generate the current predicted image similar to the current image.

The current predicted image generated by the motion compensator 431 may be provided to the predicted image encoder 350.

The predicted image encoder 350 may obtain feature data of the current predicted image by processing the current predicted image according to the parameters set through training. As described above, the predicted image encoder 350 may match the domain of the current predicted image to the domain of the correction data, and may remove artifacts from the current predicted image.

The feature data of the current predicted image output by the predicted image encoder 350, and the correction data output by the obtainer 410 may be input to the image decoder 390.

According to an embodiment of the disclosure, the feature data of the current predicted image may be concatenated with the correction data, and a result of the concatenation may be input to the image decoder 390. The concatenation may refer to a process of combining two or more pieces of feature data in a channel direction.

According to an embodiment of the disclosure, in addition to the feature data of the current predicted image and the correction data, the feature data of the current optical flow may also be input to the image decoder 390. In this case, a result of concatenation of the feature data of the current predicted image, the correction data, and the feature data of the current optical flow may be input to the image decoder 390.

The image decoder 390 may obtain the current reconstructed image by processing the feature data of the current predicted image and the correction data according to the parameters set through training. The current reconstructed image may be used to decode a next image.

The prediction decoder 630 shown in FIG. 6 may be used for performing the image decoding process shown in FIG. 3, and the artifacts included in the current predicted image may be removed through the predicted image encoder 350.

Figure 7:
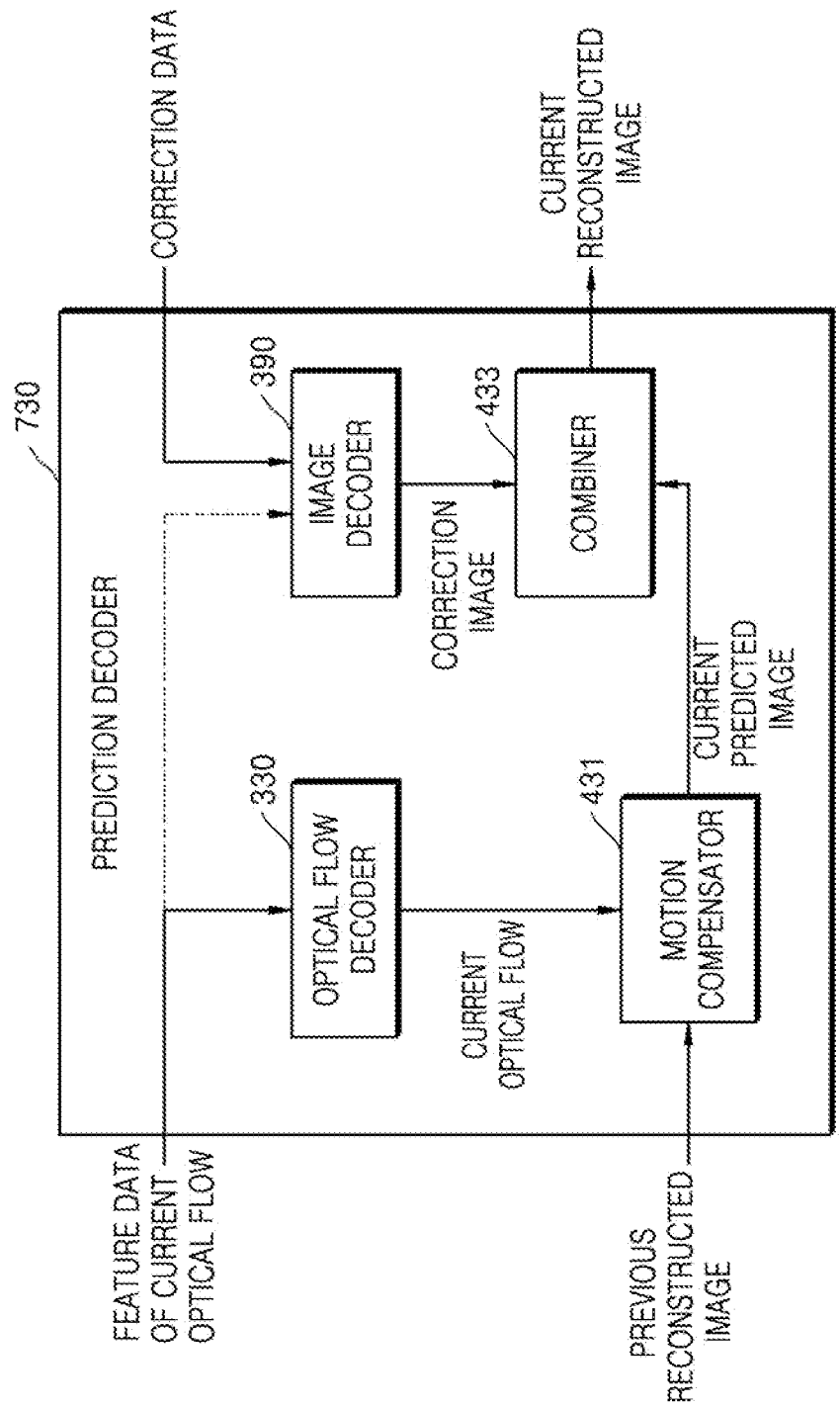
FIG. 7 is a block diagram of a configuration of a prediction decoder according to embodiments.

FIG. 7 is a block diagram of a configuration of a prediction decoder 730 according to an embodiment of the disclosure.

Referring to FIG. 7, the prediction decoder 730 may include an optical flow decoder 330, an image decoder 390, a motion compensator 431, and a combiner 433.

The optical flow decoder 330 and the image decoder 390 may be implemented as, by, or using a neural network including one or more layers (e.g., a convolutional layer).

The optical flow decoder 330 and the image decoder 390 may be stored in a memory. According to an embodiment of the disclosure, the optical flow decoder 330 and the image decoder 390 may be implemented as, by, or using at least one dedicated processor for AI.

The feature data of the current optical flow output by the obtainer 410 may be input to the optical flow decoder 330.

The optical flow decoder 330 may obtain the current optical flow by processing the feature data of the current optical flow according to the parameters set through training. The current optical flow, which is 1 D or 2D data, may include a plurality of samples.

The current optical flow may be provided to the motion compensator 431. The motion compensator 431 may generate a current predicted image similar to a current image by processing a previous reconstructed image according to the current optical flow.

The motion compensator 431 may warp the previous reconstructed image according to the current optical flow to generate the current predicted image. The warping for generating the current predicted image is merely an example, and the motion compensator 431 may apply, to the previous reconstructed image, various types of image processing for changing the previous reconstructed image, in order to generate the current predicted image similar to the current image.

The current predicted image generated by the motion compensator 431 may be provided to the combiner 433.

The correction data output by the obtainer 410 may be input to the image decoder 390. According to an embodiment of the disclosure, the feature data of the current optical flow may be input to the image decoder 390. In this case, a result of concatenating the correction data with the feature data of the current optical flow may be input to the image decoder 390.

The image decoder 390 may obtain a correction image by processing the correction data according to the parameters set through training. The correction image may be provided to the combiner 433.

The combiner 433 may obtain a current reconstructed image by combining the current predicted image provided by the motion compensator 431 with the correction image provided by the image decoder 390.

According to an embodiment of the disclosure, the combiner 433 may obtain the current reconstructed image by summing sample values of the current predicted image and sample values of the correction image.

The prediction decoder 730 of FIG. 7 may be used for performing the image decoding process shown in FIG. 1, and may be used when the image encoding apparatus 1300, which is described below, performs the image encoding process shown in FIG. 3.

Figure 8:
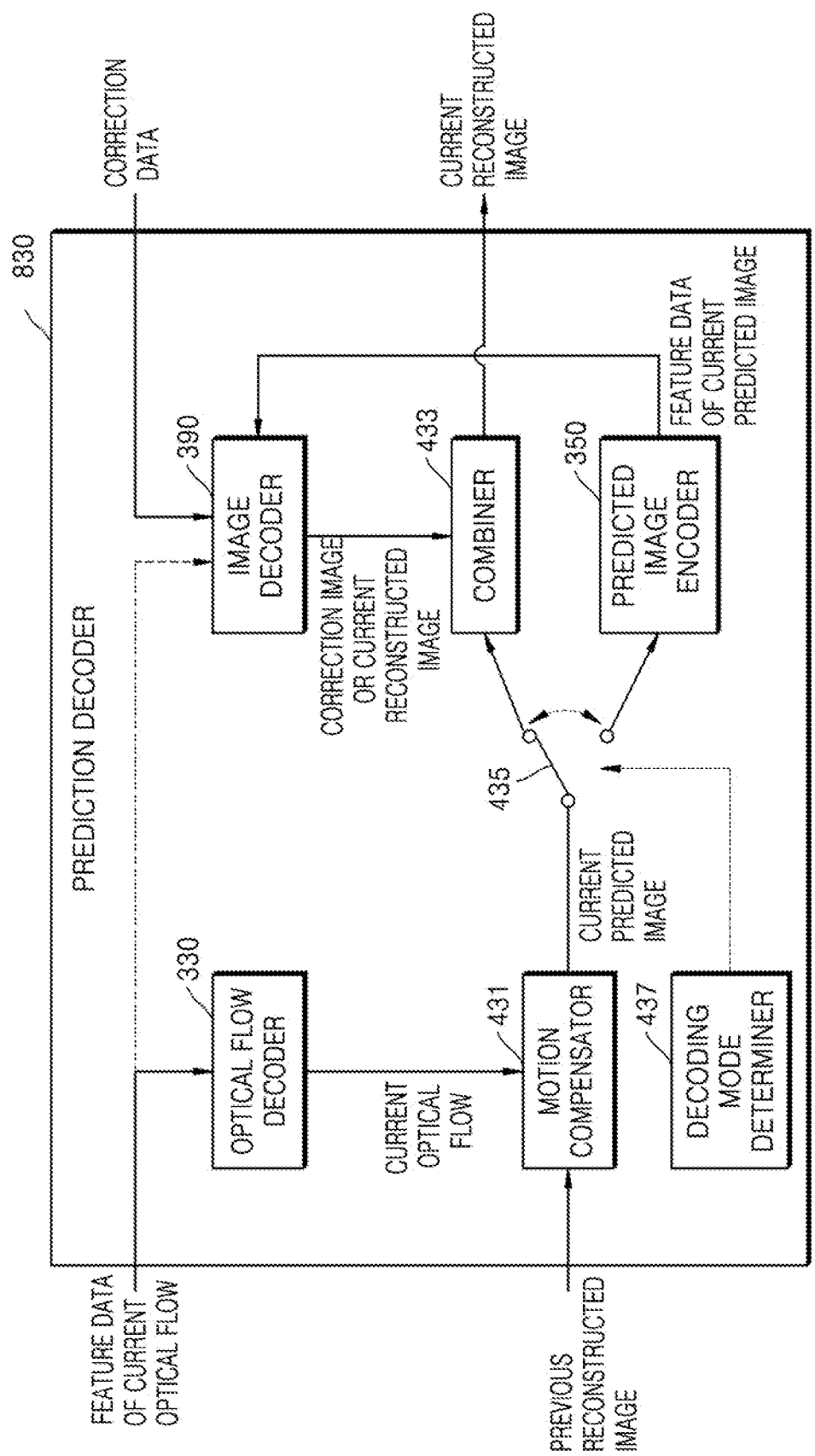
FIG. 8 is a block diagram of a configuration of a prediction decoder according to embodiments.

FIG. 8 is a block diagram of a configuration of a prediction decoder 830 according to an embodiment of the disclosure.

The prediction decoder 830 of FIG. 8 may be used for selectively performing the operation of the prediction decoder 630 shown in FIG. 6 and the operation of the prediction decoder 730 shown in FIG. 7, and thus, for example, the operation of the prediction decoder 630 shown in FIG. 6 or the operation of the prediction decoder 730 shown in FIG. 7 may be performed according to a decoding mode selected by a decoding mode determiner 437.

Referring to FIG. 8, the prediction decoder 830 may include the optical flow decoder 330, the image decoder 390, the predicted image encoder 350, the motion compensator 431, the combiner 433, the decoding mode determiner 437, and a switch 435.

The optical flow decoder 330, the image decoder 390, and the predicted image encoder 350 may be implemented as, by, or using a neural network including one or more layers (e.g., a convolutional layer).

The optical flow decoder 330, the image decoder 390, and the predicted image encoder 350 may be stored in a memory. According to an embodiment of the disclosure, the optical flow decoder 330, the image decoder 390, and the predicted image encoder 350 may be implemented as, by, or using at least one dedicated processor for AI.

The decoding mode determiner 437 may determine a decoding mode used to decode the current image to be either a first mode or a second mode. For example, the first mode may be a decoding mode in which the operation of the prediction decoder 630 illustrated in FIG. 6 is performed, and the second mode may be a decoding mode in which the operation of the prediction decoder 730 illustrated in FIG. 7 is performed.

According to an embodiment of the disclosure, the decoding mode determiner 437 may determine the decoding mode for each image sequence (or picture sequence), each group of pictures (GOP), or each image.

For example, the decoding mode determiner 437 may select one of the first mode and the second mode as the decoding mode for a first image sequence, a first GOP, or a first image, and may decode images included in the first image sequence, or the first GOP, or the first image, according to the selected decoding mode.

The decoding mode determiner 437 may select one of the first mode and the second mode as the decoding mode for a second image sequence, or a second GOP, or a second image, next to the first image sequence, or the first GOP, or the first image, and may decode images included in the second image sequence, or the second GOP, or the second image, according to the selected decoding mode.

According to an embodiment of the disclosure, the decoding mode determiner 437 may determine one of the first mode and the second mode as the decoding mode, based on information included in the bitstream. For example, the information included in the bitstream may include a flag or index indicating the decoding mode. In this case, the decoding mode determiner 437 may determine a mode indicated by the flag or index, among the first mode and the second mode, as the decoding mode.

According to an embodiment of the disclosure, the decoding mode determiner 437 may determine one of the first mode and the second mode as the decoding mode, based on the bitrate of the bitstream. As described above, when the bitrate of the bitstream is low, the probability that artifacts are included in the current optical flow is relatively high, so the decoding mode determiner 437 may determine one of the first mode and the second mode as the decoding mode, based on a result of comparing the bitrate of the bitstream with a pre-determined value.

For example, when the bitrate of the bitstream is less than the pre-determined value, the decoding mode determiner 437 may determine the decoding mode to be the first mode (for example, a decoding mode for performing the operation of the prediction decoder 630 shown in FIG. 6), and, when the bitrate of the bitstream is equal to or greater than the pre-determined value, the decoding mode determiner 437 may determine the decoding mode to be the second mode (for example, a decoding mode for performing the operation of the prediction decoder 730 shown in FIG. 7).

According to an embodiment of the disclosure, the decoding mode determiner 437 may determine one of the first mode and the second mode as the decoding mode, based on a result of comparing a quantization parameter identified from the bitstream with a pre-determined value.

For example, when the quantization parameter is equal to or greater than the pre-determined value, the decoding mode determiner 437 may determine the decoding mode to be the first mode (for example, the decoding mode for performing the operation of the prediction decoder 630 shown in FIG. 6), and, when the quantization parameter is less than the pre-determined value, the decoding mode determiner 437 may determine the decoding mode to be the second mode (for example, the decoding mode for performing the operation of the prediction decoder 730 shown in FIG. 7).

According to an embodiment of the disclosure, the decoding mode determiner 437 may determine one of the first mode and the second mode as the decoding mode, based on a result of comparing a weight used to calculate a rate-distortion value with a pre-determined value. The weight may be obtained from the bitstream.

The rate-distortion value may be calculated using Equation 1 below.

$$\text{Rate–distortion value} = k*R + D \quad \text{(Equation 1)}$$

In Equation 1, R represents a value corresponding to the bitrate of a bitstream, D represents a value indicating the degree of distortion of a reconstructed image, and k represents a weight used to derive a rate-distortion value.

When the weight k is high, an effect of R on the rate-distortion value increases, so an encoding apparatus encodes a current image so that the bitrate of the bitstream is lowered. As an example, when the weight k is low, an effect of D on the rate-distortion value increases, so the encoding apparatus encodes the current image so that a reconstructed image has an improved quality, for example, so that the bitrate of the bitstream is increased.

When the weight used to calculate the rate-distortion value is equal to or greater than the pre-determined value, the decoding mode determiner 437 may determine the decoding mode to be the first mode (for example, the decoding mode for performing the operation of the prediction decoder 630 shown in FIG. 6), and, when the weight used to calculate the rate-distortion value is less than the pre-determined value, the decoding mode determiner 437 may determine the decoding mode to be the second mode (for example, the decoding mode for performing the operation of the prediction decoder 730 shown in FIG. 7).

When any one of the first mode and the second mode is determined as the decoding mode, the decoding mode determiner 437 may control the switch 435 so that an output of the motion compensator 431 is connected to the combiner 433 or the predicted image encoder 350.

According to an embodiment of the disclosure, when the decoding mode is determined as the first mode, the decoding mode determiner 437 may control the switch 435 so that the output of the motion compensator 431 is connected to the predicted image encoder 350.

When the decoding mode is determined as the second mode, the decoding mode determiner 437 may control the switch 435 so that the output of the motion compensator 431 is connected to the combiner 433.

The switch 435 shown in FIG. 8 is intended to illustrate an embodiment of the disclosure. There is no need a switch 435 having a physical configuration has to be included in the prediction decoder 830. In other words, although an operation of the switch 435 is described as being controlled by the decoding mode determiner 437, in embodiments the decoding mode determiner 437 may control a delivery path of the current prediction image according to a program or an instruction.

The feature data of the current optical flow output by the obtainer 410 may be input to the optical flow decoder 330.

The optical flow decoder 330 may obtain the current optical flow by processing the feature data of the current optical flow according to the parameters set through training. The current optical flow, which is 1 D or 2D data, may include a plurality of samples. The current optical flow may be provided to the motion compensator 431.

The motion compensator 431 may generate a current predicted image similar to a current image by processing a previous reconstructed image according to the current optical flow.

The motion compensator 431 may warp the previous reconstructed image according to the current optical flow to generate the current predicted image. The warping for generating the current predicted image is merely an example, and the motion compensator 431 may apply, to the previous reconstructed image, various types of image processing for changing the previous reconstructed image, in order to generate the current predicted image similar to the current image.

The current predicted image generated by the motion compensator 431 may be provided to the predicted image encoder 350 or the combiner 433.

When the current predicted image is provided to the predicted image encoder 350 through the control of the switch 435 by the decoding mode determiner 437, the predicted image encoder 350 may obtain feature data of the current predicted image by processing the current predicted image according to the parameters set through training.

The feature data of the current predicted image output by the predicted image encoder 350, and the correction data output by the obtainer 410 may be input to the image decoder 390.

According to an embodiment of the disclosure, the feature data of the current predicted image may be concatenated with the correction data, and a result of the concatenation may be input to the image decoder 390.

According to an embodiment of the disclosure, in addition to the feature data of the current predicted image and the correction data, the feature data of the current optical flow may also be input to the image decoder 390. In this case, a result of concatenation of the feature data of the current predicted image, the correction data, and the feature data of the current optical flow may be input to the image decoder 390.

The image decoder 390 may obtain the current reconstructed image by processing the feature data of the current predicted image and the correction data according to the parameters set through training. The current reconstructed image may be provided to the combiner 433.

Because the current predicted image is not transferred from the motion compensator 431 to the combiner 433, the combiner 433 may output the current reconstructed image received from the image decoder 390.

When the current predicted image is provided to the combiner 433 through the control of the switch 435 by the decoding mode determiner 437, only the correction data may be input to the image decoder 390. According to an embodiment of the disclosure, a result of concatenating the feature data of the current optical flow with the correction data may be input to the image decoder 390.

The image decoder 390 may obtain a correction image by processing the correction data according to the parameters set through training. The correction image may be provided to the combiner 433.

The combiner 433 may obtain a current reconstructed image by combining the correction image with the current predicted image provided by the motion compensator 431.

Figure 9:
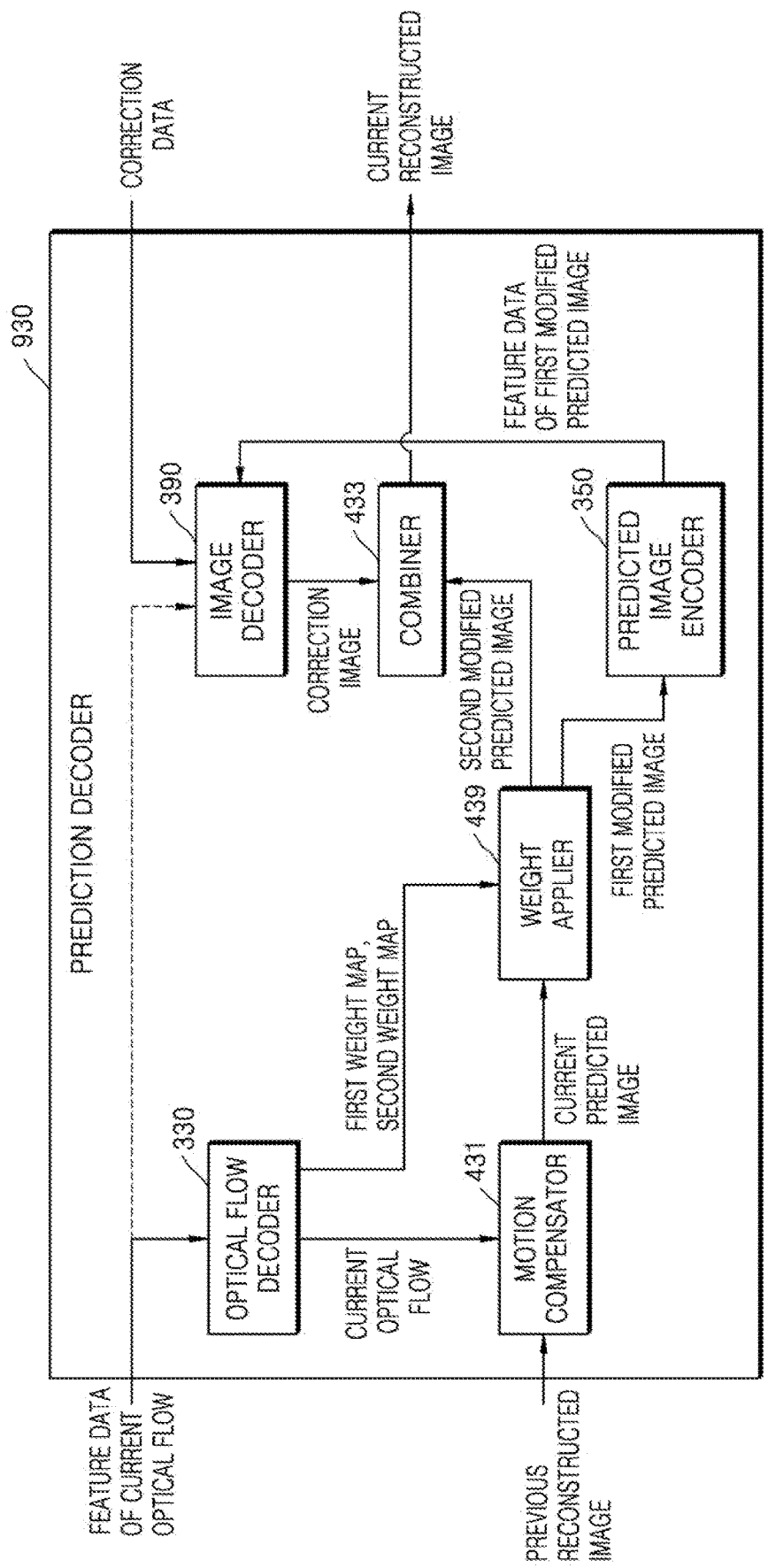
FIG. 9 is a block diagram of a configuration of a prediction decoder according to embodiments.

FIG. 9 is a block diagram of a configuration of a prediction decoder 930 according to an embodiment of the disclosure.

The prediction decoder 930 of FIG. 9 may be used for performing both the operation of the prediction decoder 630 shown in FIG. 6 and the operation of the prediction decoder 730 shown in FIG. 7, and thus may be distinguished from the prediction decoder 830 of FIG. 8 for selectively performing the operation of the prediction decoder 630 shown in FIG. 6 and the operation of the prediction decoder 730 shown in FIG. 7.

The operation of the prediction decoder 630 illustrated in FIG. 6 may be effective when the bitstream has a relatively low bitrate or an object moves quickly, and the operation of the prediction decoder 730 illustrated in FIG. 7 may be effective when the bitstream has a relatively high bitrate or the object moves slowly.

The prediction decoder 930 illustrated in FIG. 9 may effectively operate with respect to bitstreams having various bitrates and images having various speeds of motions by performing both the operation of the prediction decoder 630 illustrated in FIG. 6 and the operation of the prediction decoder 730 illustrated in FIG. 7.

Referring to FIG. 9, the prediction decoder 930 may include the optical flow decoder 330, the image decoder 390, the predicted image encoder 350, the motion compensator 431, a weight applier 439, and the combiner 433.

The optical flow decoder 330, the image decoder 390, and the predicted image encoder 350 may be implemented as, by, or using a neural network including one or more layers (e.g., a convolutional layer).

The optical flow decoder 330, the image decoder 390, and the predicted image encoder 350 may be stored in a memory. According to an embodiment of the disclosure, the optical flow decoder 330, the image decoder 390, and the predicted image encoder 350 may be implemented as, by, or using at least one dedicated processor for AI.

The feature data of the current optical flow output by the obtainer 410 may be input to the optical flow decoder 330.

The optical flow decoder 330 may obtain the current optical flow, a first weight map, and a second weight map by processing the feature data of the current optical flow according to the parameters set through training.

The first weight map and the second weight map may have the same sizes as the size of the current predicted image.

The first weight map and the second weight map may include weights applied to sample values of the current predicted image.

The first weight map may be applied to the current predicted image for the operation of the prediction decoder 630 illustrated in FIG. 6, and the second weight map may be applied to the current predicted image for the operation of the prediction decoder 730 illustrated in FIG. 7.

The current optical flow may be provided to the motion compensator 431.

The motion compensator 431 may generate the current predicted image similar to the current image by processing the previous reconstructed image according to the current optical flow.

The motion compensator 431 may warp the previous reconstructed image according to the current optical flow to generate the current predicted image. The warping for generating the current predicted image is merely an example, and the motion compensator 431 may apply, to the previous reconstructed image, various types of image processing for changing the previous reconstructed image, in order to generate the current predicted image similar to the current image.

The current predicted image generated by the motion compensator 431 may be provided to the weight applier 439.

The weight applier 439 may apply each of the first weight map and the second weight map output by the optical flow decoder 330 to the current predicted image.

According to an embodiment of the disclosure, the weight applier 439 may apply the first weight map to the current predicted image to obtain a first modified predicted image, and may apply the second weight map to the current predicted image to obtain a second modified predicted image.

For example, the weight applier 439 may obtain the first modified predicted image by multiplying the sample values of the current predicted image by sample values of the first weight map, and may obtain the second modified predicted image by multiplying the sample values of the current predicted image by sample values of the second weight map.

The first modified predicted image may be provided to the predicted image encoder 350, and the second modified predicted image may be provided to the combiner 433.

The predicted image encoder 350 may obtain feature data of the first modified predicted image by processing the first modified predicted image according to the parameters set through training.

The predicted image encoder 350 may match the domain of the first modified predicted image to the domain of the correction data, and may remove artifacts that may exist in the first modified predicted image.

The feature data of the first modified predicted image output by the predicted image encoder 350, and the correction data output by the obtainer 410 may be input to the image decoder 390.

According to an embodiment of the disclosure, the feature data of the first modified predicted image may be concatenated with the correction data, and a result of the concatenation may be input to the image decoder 390.

According to an embodiment of the disclosure, in addition to the feature data of the first modified predicted image and the correction data, the feature data of the current optical flow may also be input to the image decoder 390.

The image decoder 390 may obtain a correction image by processing the feature data of the first modified predicted image and the correction data according to the parameters set through training. The correction image may be provided to the combiner 433.

The combiner 433 may obtain a current reconstructed image by combining the correction image with the second modified predicted image. The current reconstructed image may be used to decode a next image.

According to the prediction decoder 930 of FIG. 9, a coupling ratio between the samples of the current predicted image and the samples of the correction image may vary according to sample values (i.e., weights) of the second weight map.

For example, when a sample at a specific location in the current optical flow corresponds to an artifact, the optical flow decoder 330 may output, as 0, a sample value at a location in the second weight map that corresponds to the specific location in the current optical flow. In this case, a sample value at a location in the second transformed predicted image that corresponds to the specific location in the current optical flow also becomes 0. Accordingly, a sample at a location in the current predicted image that corresponds to the specific location in the current optical flow may not affect the sample of the current reconstructed image. In other words, a sample value in the current reconstructed image may be the same as a sample value in the correction image.

As an example, when a sample at a specific location in the current optical flow does not correspond to an artifact, the optical flow decoder 330 may output, as a value greater than 1, a sample value at a location in the second weight map that corresponds to the specific location in the current optical flow. In this case, a sample value at a location in the second modified predicted image that corresponds to the specific location in the current optical flow becomes greater than a sample value at a location in the current predicted image that corresponds to the specific location in the current optical flow. Accordingly, a sample at a location in the current predicted image that corresponds to the specific location in the current optical flow may greatly affect the sample of the current reconstructed image.

In other words, according to the prediction decoder 930 of FIG. 9, an influence or contribution of the sample of the second modified predicted image and an influence or contribution of the sample of the first modified predicted image may be adjusted for each sample of the current reconstructed image. Therefore, a higher quality current reconstructed image may be obtained.

Figure 10:
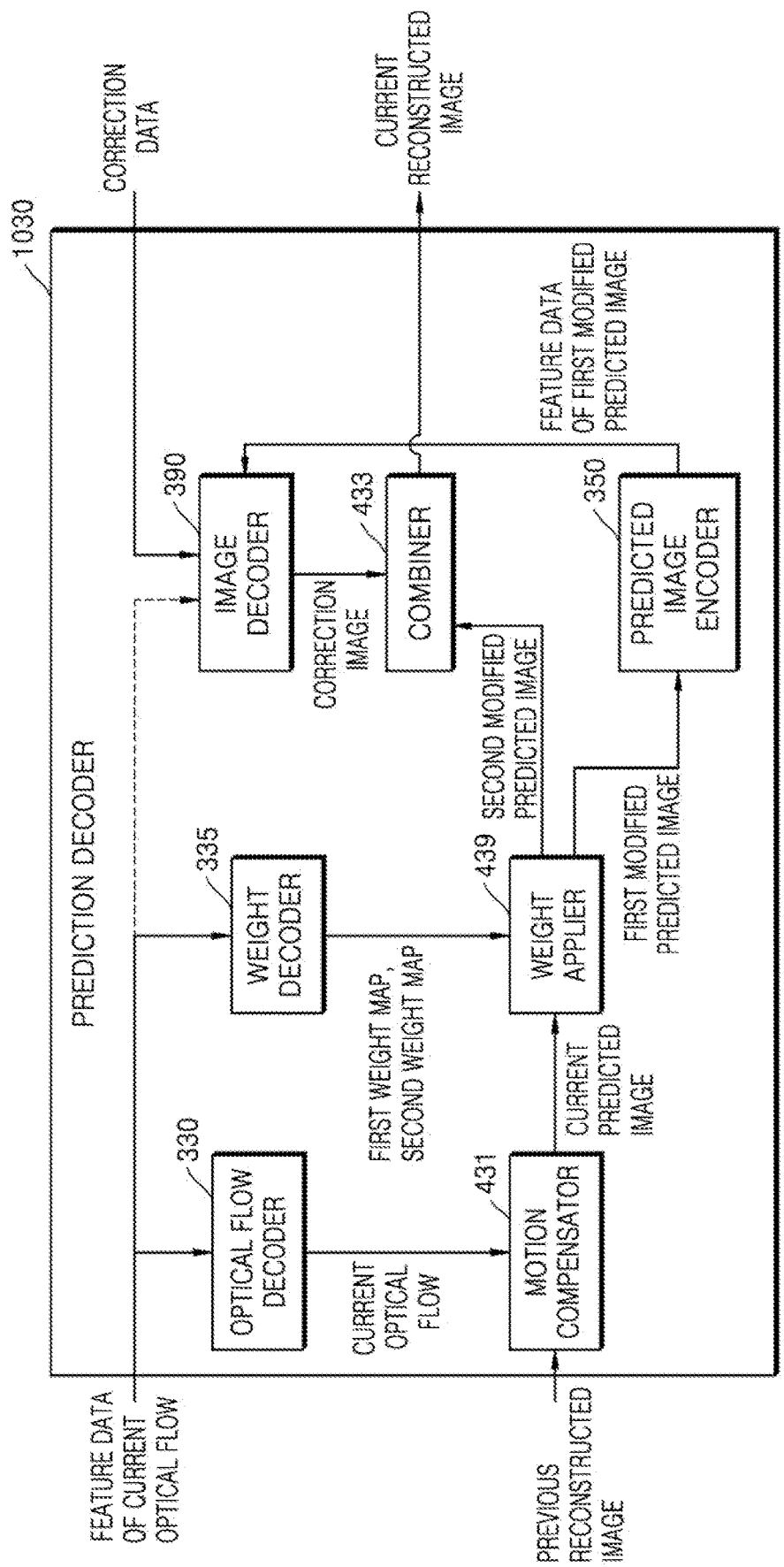
FIG. 10 is a block diagram of a configuration of a prediction decoder according to embodiments.

FIG. 10 is a block diagram of a configuration of a prediction decoder 1030 according to an embodiment of the disclosure.

In the prediction decoder 930 of FIG. 9, the first weight map and the second weight map are output by the optical flow decoder 330. However, in the prediction decoder 1030 of FIG. 10, the first weight map and the second weight map may be output by a separate weight decoder 335 that receives the feature data of the current optical flow.

The weight decoder 335 may output the first weight map and the second weight map by processing the feature data of the current optical flow according to parameters previously set through training.

The operation of the prediction decoder 1030 shown in FIG. 10 may be the same as, or similar to, the operation of the prediction decoder 930 shown in FIG. 9 except for the weight decoder 335 that outputs the first weight map and the second weight map, and thus a detailed description thereof will be omitted.

Figure 11:
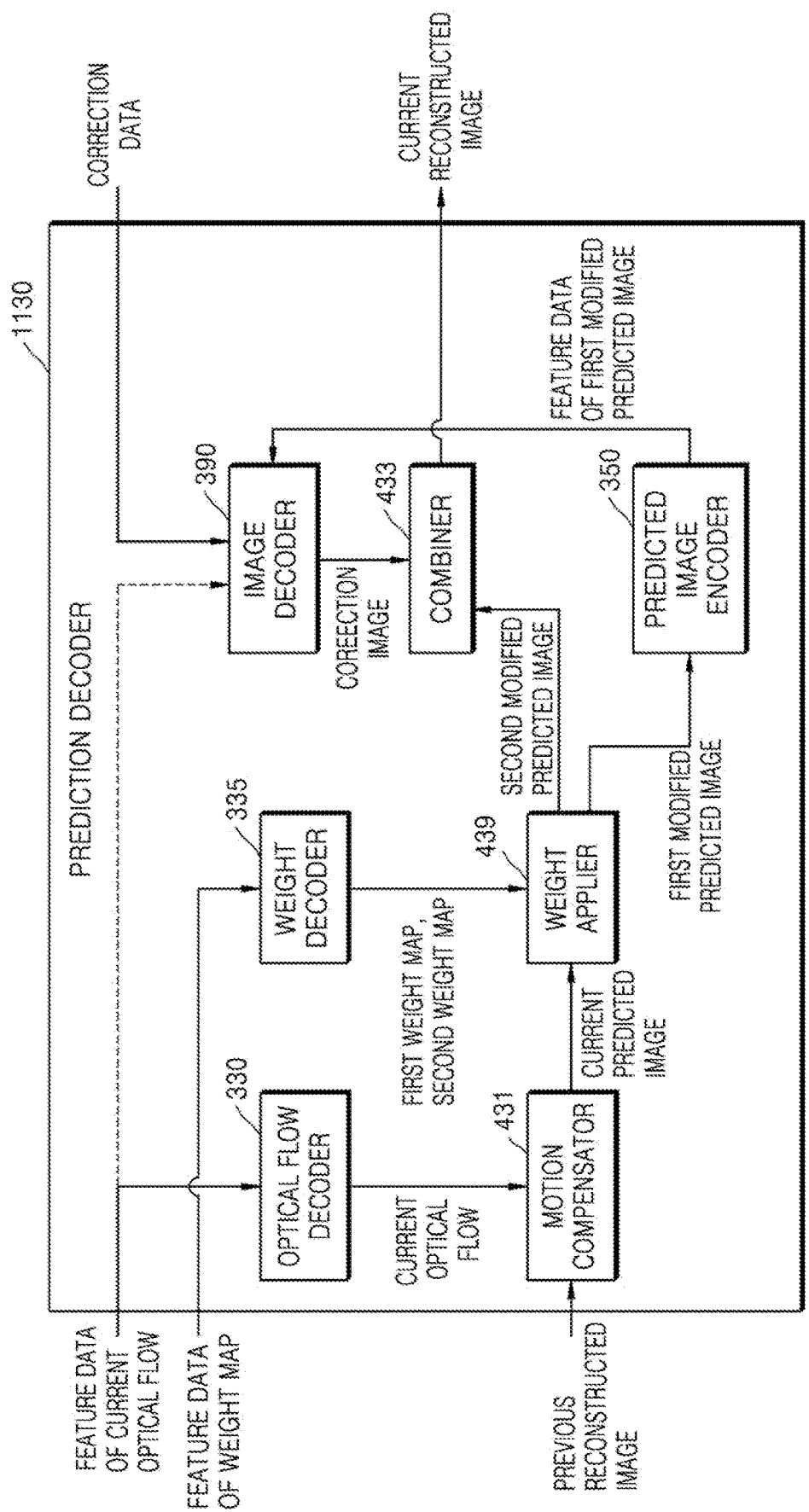
FIG. 11 is a block diagram of a configuration of a prediction decoder according to embodiments.

FIG. 11 is a block diagram of a configuration of a prediction decoder 1130 according to an embodiment of the disclosure.

In the prediction decoder 930 of FIG. 9, the first weight map and the second weight map may be output by the optical flow decoder 330. However, in the prediction decoder 1130 of FIG. 11, the first weight map and the second weight map may be obtained by a weight decoder 335 that receives feature data of a weight map.

The feature data of the weight map may be generated by the image encoding apparatus 1300 and included in the bitstream. The obtainer 410 may obtain the feature data of the weight map from the bitstream and provide the obtained feature data to the weight decoder 335.

The weight decoder 335 may output the first weight map and the second weight map by processing the feature data of the weight map according to the parameters set through training.

The operation of the prediction decoder 1130 shown in FIG. 11 may be the same as, or similar to, the operation of the prediction decoder 930 shown in FIG. 9 except for the weight decoder 335 that outputs the first weight map and the second weight map, and thus a detailed description thereof will be omitted.

Figure 12:
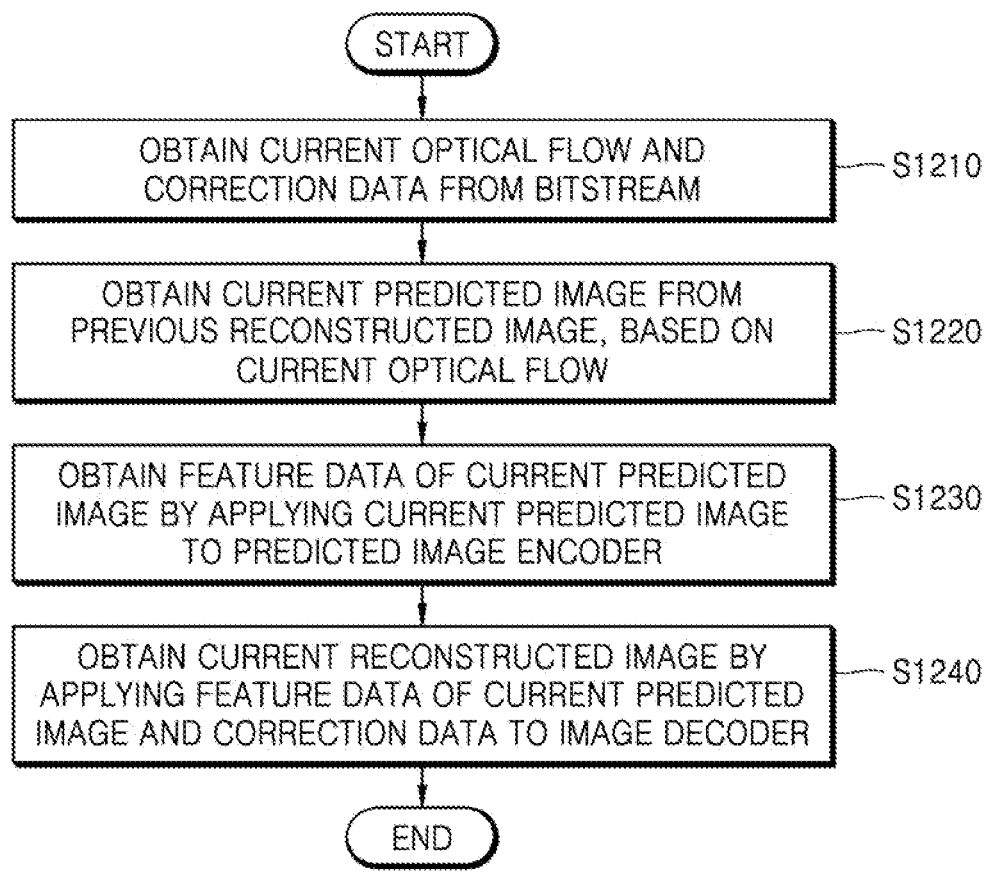
FIG. 12 is a flowchart of an image decoding method according to embodiments.

FIG. 12 is a flowchart of an image decoding method performed by the image decoding apparatus 400, according to an embodiment of the disclosure.

In operation S1210, the image decoding apparatus 400 obtains the current optical flow and the correction data from the bitstream.

The image decoding apparatus 400 may obtain the feature data of the current optical flow from the bitstream, and may obtain the current optical flow by applying the feature data of the current optical flow to the optical flow decoder 330.

According to an embodiment of the disclosure, the image decoding apparatus 400 may obtain the feature data of the current optical flow and the correction data by entropy-decoding, inversely quantizing, and/or inversely transforming the bits included in the bitstream.

According to an embodiment of the disclosure, the image decoding apparatus 400 may further obtain the feature data of the weight map from the bitstream.

In operation S1220, the image decoding apparatus 400 obtains the current predicted image from the previous reconstructed image, based on the current optical flow. Warping may be used to obtain the current predicted image.

In operation S1230, the image decoding apparatus 400 obtains the feature data of the current predicted image by applying the current predicted image to the predicted image encoder 350.

According to an embodiment of the disclosure, the image decoding apparatus 400 may obtain the first modified predicted image by applying the first weight map to the current predicted image, and may obtain the feature data of the first modified predicted image by applying the first modified predicted image to the predicted image encoder 350.

In operation S1240, the image decoding apparatus 400 obtains the current reconstructed image by applying the feature data of the current predicted image and the correction data to the image decoder 390.

According to an embodiment of the disclosure, the image decoding apparatus 400 may apply the feature data of the current predicted image, the correction data, and the feature data of the current optical flow to the image decoder 390.

According to an embodiment of the disclosure, the image decoding apparatus 400 may obtain the correction image by applying the feature data of the first modified predicted image and the correction data to the image decoder 390. In this case, the image decoding apparatus 400 may obtain the second modified predicted image by applying the second weight map to the current predicted image, and may obtain the current reconstructed image by combining the correction image with the second modified predicted image.

The embodiment described above with reference to FIG. 12 may be performed by the image decoding apparatus 400 including the prediction decoder 630 of FIG. 6, the prediction decoder 830 of FIG. 8, the prediction decoder 930 of FIG. 9, the prediction decoder 1030 of FIG. 10, and the prediction decoder 1130 of FIG. 11.

In embodiments, image decoding apparatus 400 including the prediction decoder 830 of FIG. 8 may perform the processes shown in FIG. 12 when the output of the motion compensator 431 is transmitted to the predicted image encoder 350.

In embodiments, the image decoding apparatus 400 including the prediction decoder 730 of FIG. 7 or the prediction decoder 830 of FIG. 8 (when the output of the motion compensator 431 is transmitted to the combiner 433) may obtain the current reconstructed image by combining the correction image obtained by the image decoder 390 based on the correction data with the current predicted image.

An example of an operation of the image encoding apparatus 1300 is described below with reference to FIGS. 13 through 20.

FIG. 13 is a block diagram of a structure of the image encoding apparatus 1300 according to an embodiment of the disclosure.

Referring to FIG. 13, the image encoding apparatus 1300 may include a prediction encoder 1310, a generator 1320, which may be referred to as a bitstream generating module, an obtainer 1330, which may be referred to as an obtaining module, and a prediction decoder 1340.

The prediction encoder 1310, the generator 1320, the obtainer 1330, and the prediction decoder 1340 may be implemented as, by, or using processors. The prediction encoder 1310, the generator 1320, the obtainer 1330, and the prediction decoder 1340 may operate according to instructions stored in a memory.

Although the prediction encoder 1310, the generator 1320, the obtainer 1330, and the prediction decoder 1340 are individually illustrated in FIG. 13, the prediction encoder 1310, the generator 1320, the obtainer 1330, and the prediction decoder 1340 may be implemented as, by, or using one processor. In this case, the prediction encoder 1310, the generator 1320, the obtainer 1330, and the prediction decoder 1340 may be implemented as, by, or using a dedicated processor, or may be implemented through a combination of software and a general-purpose processor such as an AP, a CPU, or GPU. The dedicated processor may include a memory for implementing an embodiment of the disclosure or a memory processing unit for using an external memory.

The prediction encoder 1310, the generator 1320, the obtainer 1330, and the prediction decoder 1340 may be implemented as, by, or using a plurality of processors. In this case, the prediction encoder 1310, the generator 1320, the obtainer 1330, and the prediction decoder 1340 may be implemented as, by, or using a combination of dedicated processors, or may be implemented through a combination of software and a plurality of general-purpose processors such as APs, CPUs, or GPUs.

The prediction encoder 1310 may obtain feature data of a current optical flow and correction data by using a current image and a previous reconstructed image.

The prediction encoder 1310 may use the optical flow encoder 310 and the image encoder 370 both based on a neural network in order to obtain the feature data of the current residual optical flow and the correction data. An example of the operation of the prediction encoder 1310 is described in detail below with reference to FIGS. 14 through 19.

The feature data of the current optical flow and the correction data both obtained by the prediction encoder 1310 may be transmitted to the generator 1320.

The generator 1320 may generate a bitstream including the feature data of the current optical flow and the correction data.

According to an embodiment of the disclosure, the generator 1320 may generate a first bitstream corresponding to the feature data of the current optical flow and a second bitstream corresponding to the correction data.

The bitstream may be transmitted by the image decoding apparatus 400 through a network. According to an embodiment of the disclosure, the bitstream may be stored in a data storage medium including a magnetic medium (such as, a hard disk, a floppy disk, or a magnetic tape), an optical recording medium (such as, CD-ROM or DVD), or a magneto-optical medium (such as, a floptical disk).

The obtainer 1330 may obtain the feature data of the current optical flow and the correction data from the bitstream generated by the generator 1320.

According to an embodiment of the disclosure, the obtainer 1330 may receive the feature data of the current optical flow and the correction data from the prediction encoder 1310.

The feature data of the current optical flow and the correction data may be transmitted to the prediction decoder 1340.

The prediction decoder 1340 may obtain a current reconstructed image by using the feature data of the current optical flow and the correction data.

The current reconstructed image obtained by the prediction decoder 1340 may be used in a process of encoding a next image.

Configurations and operations of the obtainer 1330 and the prediction decoder 1340 may correspond to those of the obtainer 410 and the prediction decoder 430 of the image decoding apparatus 400.

For example, the configuration and operation of the obtainer 1330 may correspond to those of the obtainer 410 of FIG. 5, and the configuration and operation of the prediction decoder 1340 may correspond to those of any one of the prediction decoder 630 of FIG. 6, the prediction decoder 730 of FIG. 7, the prediction decoder 830 of FIG. 8, the prediction decoder 930 of FIG. 9, the prediction decoder 1030 of FIG. 10, and the prediction decoder 1130 of FIG. 11.

Figure 14:
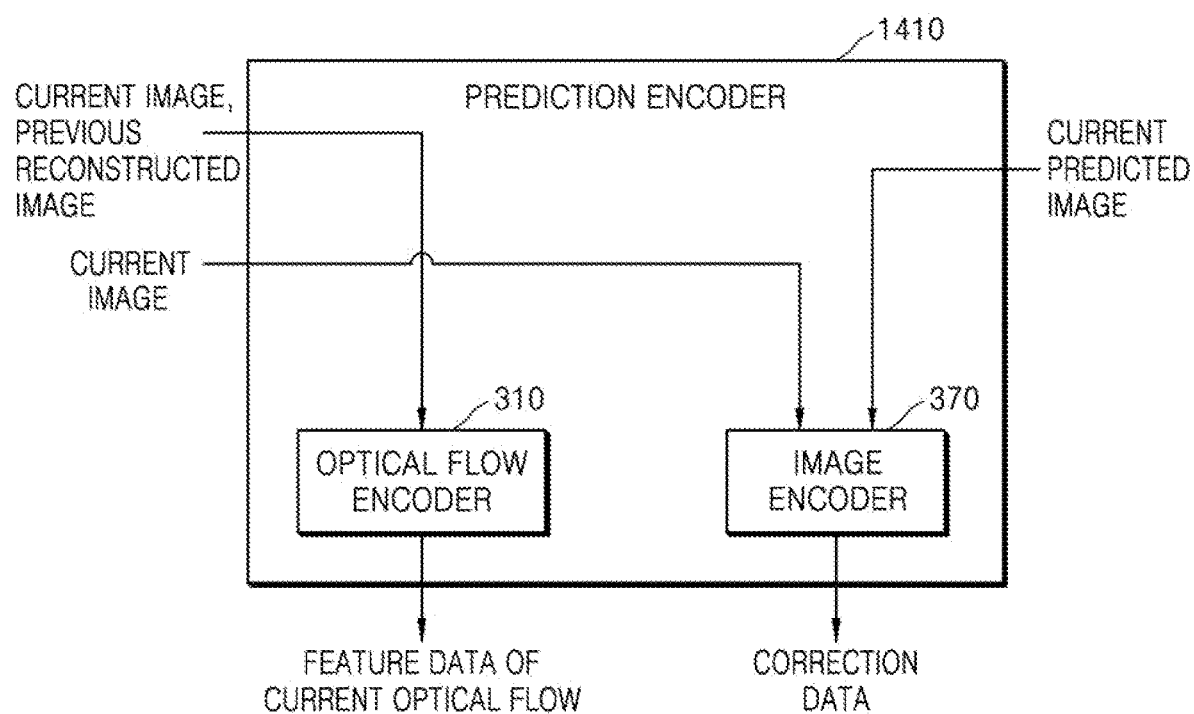
FIG. 14 is a block diagram of a configuration of a prediction encoder according to embodiments.

FIG. 14 is a block diagram of a configuration of a prediction encoder 1410 according to an embodiment of the disclosure.

The prediction encoder 1410 may include the optical flow encoder 310 and the image encoder 370.

The optical flow encoder 310 and the image encoder 370 may be implemented as, by, or using neural networks including one or more layers (e.g., a convolutional layer).

The optical flow encoder 310 and the image encoder 370 may be stored in a memory. The optical flow encoder 310 and the image encoder 370 may be implemented as, by, or using at least one dedicated processor for AI.

Referring to FIG. 14, the current image and the previous reconstructed image may be input to the optical flow encoder 310. The optical flow encoder 310 may obtain the feature data of the current optical flow by processing the current image and the previous reconstructed image according to the parameters set through training. The feature data of the current optical flow may be transmitted to the generator 1320.

The current predicted image generated from the previous reconstructed image based on the current optical flow may be input to the image encoder 370, together with the current image. According to an embodiment of the disclosure, a result of concatenating the current predicted image with the current image may be input to the image encoder 370.

The image encoder 370 may obtain the correction data by processing the current image and the current predicted image according to the parameters set through training. The correction data may be transmitted to the generator 1320.

As described above, because not only the current predicted image including an artifact but also the current image including no artifacts are input to the image encoder 370, the artifact in the current predicted image may be not considered in generating the correction data.

In embodiments, the prediction encoder 1410 of FIG. 14 may be used to perform the image encoding process shown in FIG. 3.

Figure 15:
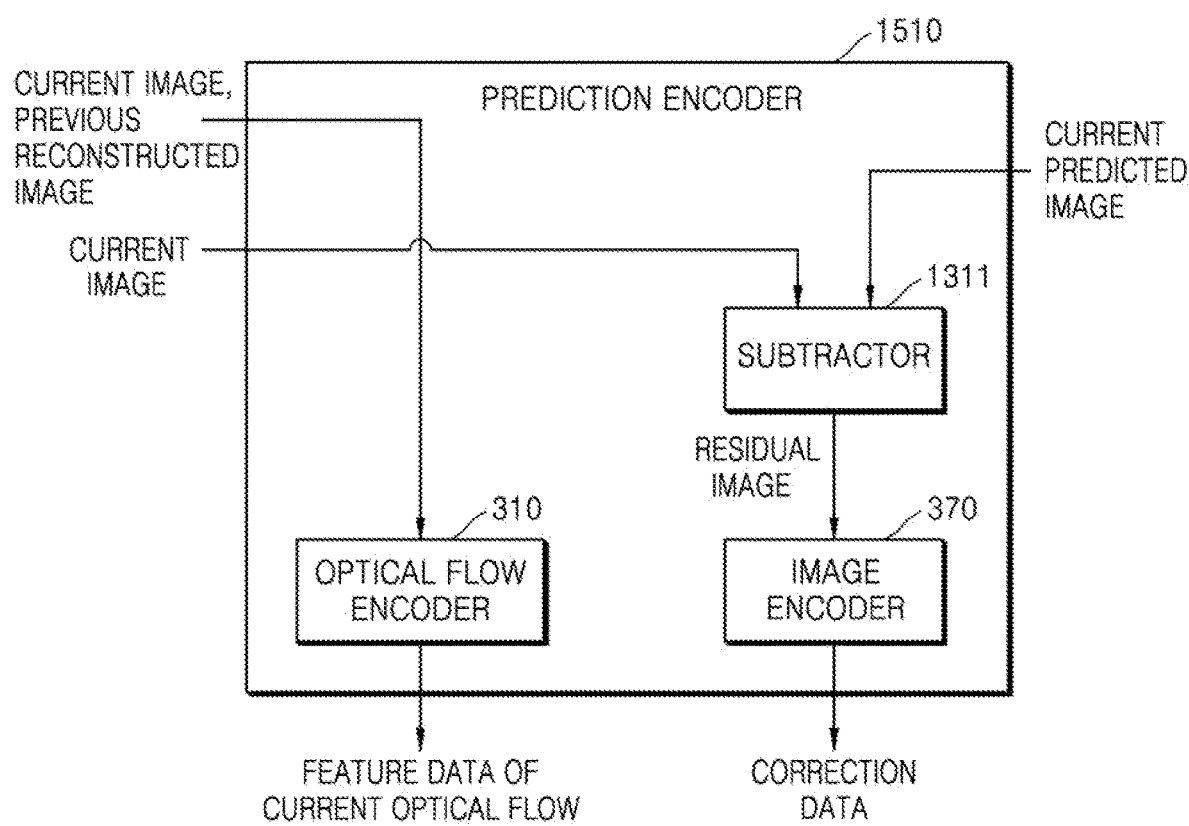
FIG. 15 is a block diagram of a configuration of a prediction encoder according to embodiments.

FIG. 15 is a block diagram of a configuration of a prediction encoder 1510 according to an embodiment of the disclosure.

The prediction encoder 1510 may include the optical flow encoder 310, the image encoder 370, and a subtractor 1311.

The optical flow encoder 310 and the image encoder 370 may be implemented as, by, or using neural networks including one or more layers (e.g., a convolutional layer).

The optical flow encoder 310 and the image encoder 370 may be stored in a memory. The optical flow encoder 310 and the image encoder 370 may be implemented as, by, or using at least one dedicated processor for AI.

Referring to FIG. 15, the current image and the previous reconstructed image may be input to the optical flow encoder 310. The optical flow encoder 310 may obtain the feature data of the current optical flow by processing the current image and the previous reconstructed image according to the parameters set through training. The feature data of the current optical flow may be transmitted to the generator 1320.

The current predicted image generated from the previous reconstructed image based on the current optical flow may be input to the subtractor 1311, together with the current image.

The subtractor 1311 may obtain a residual image by using the current image and the current predicted image. According to an embodiment of the disclosure, the subtractor 1311 may obtain a residual image including difference values between sample values of the current image and sample values of the current predicted image.

The residual image may be input to the image encoder 370, and the image encoder 370 may obtain the correction data by processing the residual image according to the parameters set through training. The correction data may be transmitted to the generator 1320.

The prediction encoder 1510 of FIG. 15 may be used for performing the image encoding process shown in FIG. 1, and may be used when the image decoding apparatus 400 includes the prediction decoder 630 of FIG. 6.

For example, even when the image encoding apparatus 1300 including the prediction encoder 1510 of FIG. 15 fails to remove artifacts from the residual image, the image decoding apparatus including the prediction decoder 630 of FIG. 6 may obtain feature data of the current predicted image from which artifacts have been removed, by using the predicted image encoder 350, and may obtain a high-quality current reconstructed image by using the current predicted image from which artifacts have been removed.

Figure 16:
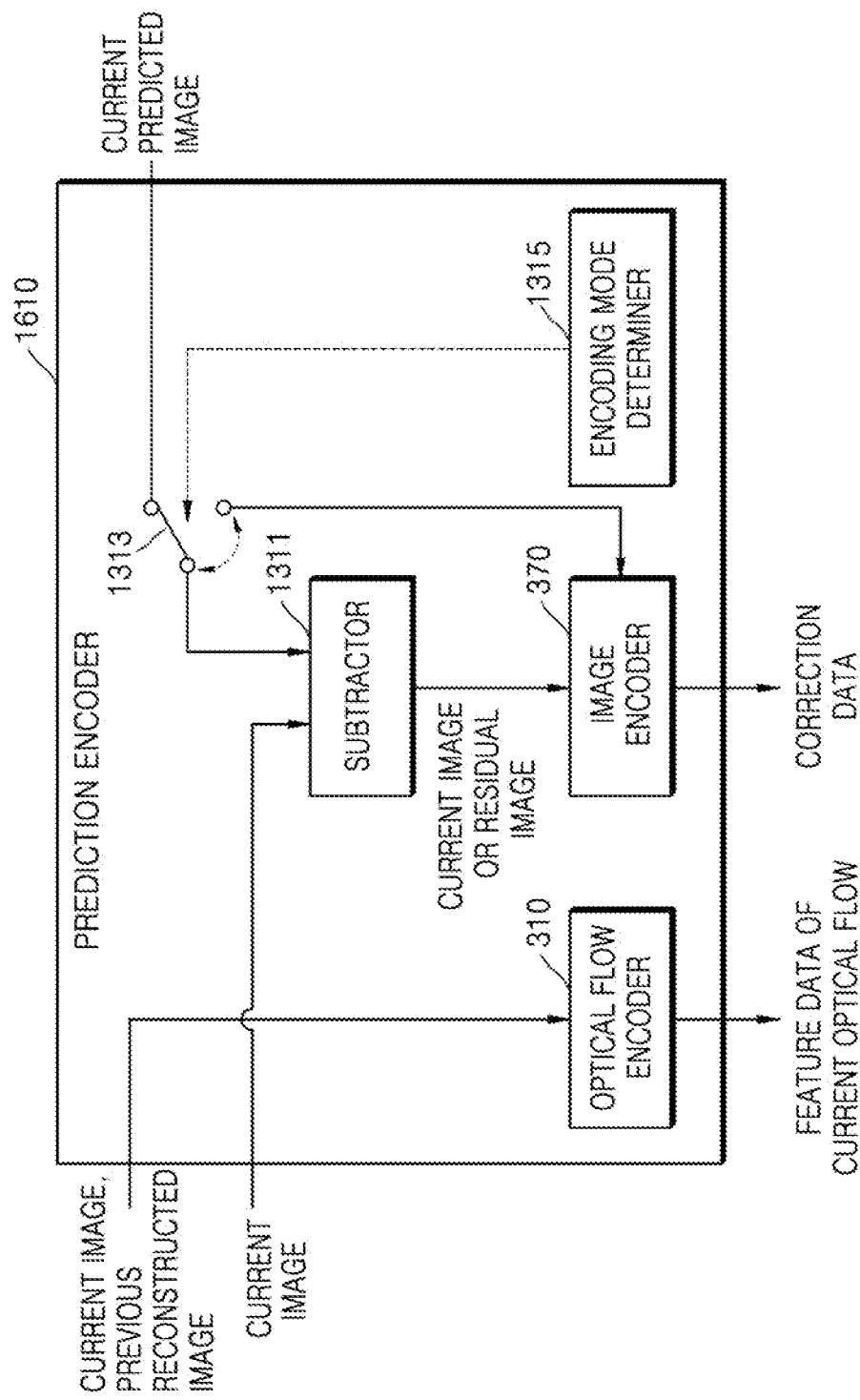
FIG. 16 is a block diagram of a configuration of a prediction encoder according to embodiments.

FIG. 16 is a block diagram of a configuration of a prediction encoder 1610 according to an embodiment of the disclosure.

The prediction encoder 1610 of FIG. 16 is for selectively performing the operation of the prediction encoder 1410 shown in FIG. 14 and the operation of the prediction encoder 1510 shown in FIG. 15, and thus, for example, the operation of the prediction encoder 1410 shown in FIG. 14 or the operation of the prediction encoder 1510 shown in FIG. 15 may be performed according to an encoding mode selected by an encoding mode determiner 1315.

Referring to FIG. 16, the prediction encoder 1610 may include the optical flow encoder 310, the image encoder 370, the subtractor 1311, the encoding mode determiner 1315, and a switch 1313.

The optical flow encoder 310 and the image encoder 370 may be implemented as, by, or using neural networks including one or more layers (e.g., a convolutional layer).

The optical flow encoder 310 and the image encoder 370 may be stored in a memory. According to an embodiment of the disclosure, the optical flow encoder 310 and the image encoder 370 may be implemented as, by, or using at least one dedicated processor for AI.

The encoding mode determiner 1315 may determine an encoding mode for encoding the current image to be either a first mode or a second mode. For example, the first mode may be an encoding mode in which the operation of the prediction encoder 1410 illustrated in FIG. 14 is performed, and the second mode may be an encoding mode in which the operation of the prediction encoder 1510 illustrated in FIG. 15 is performed.

According to an embodiment of the disclosure, the encoding mode determiner 1315 may determine the encoding mode for each image sequence (or picture sequence), each GOP, or each image.

For example, the encoding mode determiner 1315 may select one of the first mode and the second mode as the encoding mode for a first image sequence, or a first GOP, or a first image, and may encode images included in the first image sequence, or the first GOP, or the first image, according to the selected encoding mode.

The encoding mode determiner 1315 may select one of the first mode and the second mode as the encoding mode for a second image sequence, or a second GOP, or a second image, next to the first image sequence, or the first GOP, or the first image, and may encode images included in the second image sequence, or the second GOP, or the second image, according to the selected encoding mode.

According to an embodiment of the disclosure, the encoding mode determiner 1315 may determine one of the first mode and the second mode as the encoding mode, based on a bitrate of a bitstream generated in the first mode and a bitrate of a bitstream generated in the second mode. For example, the encoding mode determiner 1315 may determine, as the encoding mode, a mode capable of generating a bitstream of a lower bitrate among the first mode and the second mode.

According to an embodiment of the disclosure, the encoding mode determiner 1315 may determine one of the first mode and the second mode as the encoding mode, based on a result of comparison between a rate-distortion value when an image, images included in an image sequence, or images included in a GOP has been encoded in the first mode and a rate-distortion value when the image, the images included in the image sequence, or the images included in the GOP has been encoded in the second mode. For example, the encoding mode determiner 1315 may determine, as the encoding mode, a mode in which a lower rate-distortion value is derived among the first mode and the second mode.

According to an embodiment of the disclosure, the encoding mode determiner 1315 may determine one of the first mode and the second mode as the encoding mode, based on a result of comparing a weight used to calculate a rate-distortion value with a pre-determined value. The weight used to calculate the rate-distortion value may be pre-set by the encoding mode determiner 1315.

For example, when the weight used to calculate the rate-distortion value is equal to or greater than the pre-determined value, the encoding mode determiner 1315 may determine the encoding mode to be the first mode (for example, an encoding mode for performing the operation of the prediction encoder 1410 shown in FIG. 14), and, when the weight used to calculate the rate-distortion value is less than the pre-determined value, the encoding mode determiner 1315 may determine the encoding mode to be the second mode (for example, the encoding mode for performing the operation of the prediction encoder 1510 shown in FIG. 15). The weight used to calculate the rate-distortion value may be included in the bitstream through the generator 1320.

According to an embodiment of the disclosure, the encoding mode determiner 1315 may determine one of the first mode and the second mode as the encoding mode, based on a result of comparing a quantization parameter with a pre-determined value.

For example, when the quantization parameter is equal to or greater than the pre-determined value, the encoding mode determiner 1315 may determine the encoding mode to be the first mode (for example, the encoding mode for performing the operation of the prediction decoder 1410 shown in FIG. 14), and, when the quantization parameter is less than the pre-determined value, the encoding mode determiner 1315 may determine the encoding mode to be the second mode (for example, the encoding mode for performing the operation of the prediction decoder 1510 shown in FIG. 15). The quantization parameter may be included in the bitstream.

According to an embodiment of the disclosure, the encoding mode determiner 1315 may transmit information indicating the encoding mode selected among the first mode and the second mode to the generator 1320, and the generator 1320 may include the information in the bitstream. The information indicating the encoding mode for encoding the current image may include a flag or an index.

According to an embodiment of the disclosure, when the encoding mode is determined as the first mode, the encoding mode determiner 1315 may control the switch 1313 so that the current predicted image is input to the image encoder 370. When the encoding mode is determined as the second mode, the encoding mode determiner 1315 may control the switch 1313 so that the current predicted image is input to the subtractor 1311.

The current image and the previous reconstructed image may be input to the optical flow encoder 310. The optical flow encoder 310 may obtain the feature data of the current optical flow by processing the current image and the previous reconstructed image according to the parameters set through training. The feature data of the current optical flow may be transmitted to the generator 1320.

The current predicted image generated from the previous reconstructed image based on the current optical flow may be input to the subtractor 1311 or the image encoder 370.

The subtractor 1311 may obtain the residual image by using the current image and the current predicted image. According to an embodiment of the disclosure, the subtractor 1311 may obtain the residual image including difference values between the sample values of the current image and the sample values of the current predicted image.

The residual image may be input to the image encoder 370, and the image encoder 370 may obtain the correction data by processing the residual image according to the parameters set through training. The correction data may be transmitted to the generator 1320.

When the current predicted image is input to the image encoder 370, because only the current image is input to the subtractor 1311, the current image may be transmitted from the subtractor 1311 to the image encoder 370 without changes.

The image encoder 370 may obtain the correction data by processing the current image and the current predicted image according to the parameters set through training. The correction data may be transmitted to the generator 1320.

Figure 17:
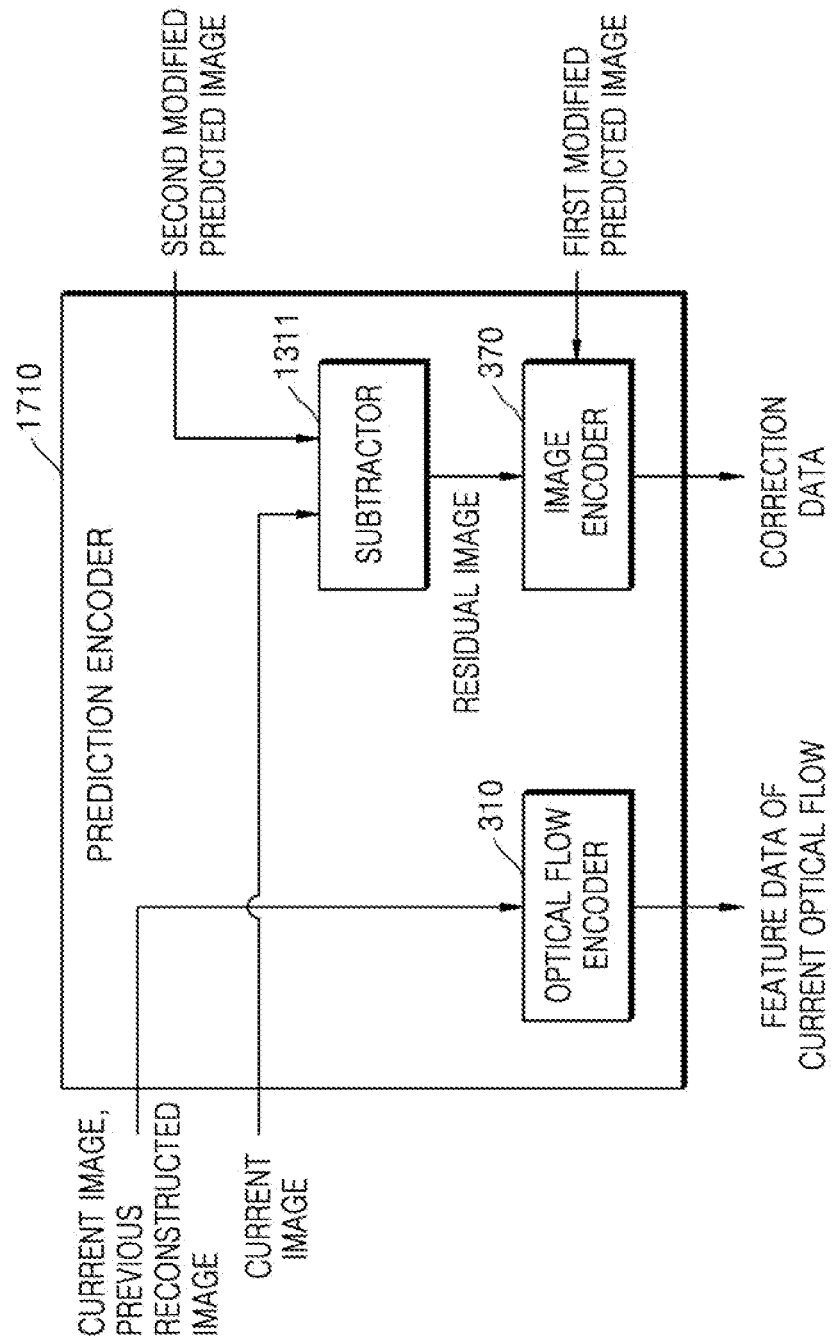
FIG. 17 is a block diagram of a configuration of a prediction encoder according to embodiments.

FIG. 17 is a block diagram of a configuration of a prediction encoder 1710 according to an embodiment of the disclosure.

The prediction encoder 1710 of FIG. 17 may be used for performing both the operation of the prediction encoder 1410 shown in FIG. 14 and the operation of the prediction encoder 1510 shown in FIG. 15, and thus may be distinguished from the prediction encoder 1610 of FIG. 16 for selectively performing the operation of the prediction encoder 1410 shown in FIG. 14 and the operation of the prediction encoder 1510 shown in FIG. 15.

Referring to FIG. 17, the current image and the previous reconstructed image may be input to the optical flow encoder 310. The optical flow encoder 310 may obtain the feature data of the current optical flow by processing the current image and the previous reconstructed image according to the parameters set through training. The feature data of the current optical flow may be transmitted to the generator 1320.

The current predicted image may be generated from the previous reconstructed image, based on the current optical flow. A first modified predicted image may be obtained by applying a first weight map to the current predicted image, and a second modified predicted image may be obtained by applying a second weight map to the current predicted image. The first weight map and the second weight map may be obtained by the prediction decoder 1340.

According to an embodiment of the disclosure, the prediction encoder 1710 may obtain the first modified predicted image and the second modified predicted image from the prediction decoder 1340 having the same configuration as the prediction decoder 930 of FIG. 9 or the prediction decoder 1030 of FIG. 10.

The first modified predicted image may be provided to the image encoder 370, and the second modified predicted image may be provided to the subtractor 1311.

The subtractor 1311 may obtain a residual image by using the current image and the second modified predicted image.

According to an embodiment of the disclosure, the subtractor 1311 may obtain a residual image including difference values between the sample values of the current image and the sample values of the second modified predicted image. The residual image may be input to the image encoder 370.

In response to the prediction decoders 930 and 1030 of FIGS. 9 and 10 combining the second modified prediction image with the correction image, the subtractor 1311 may obtain the residual image from the current image and the second modified predicted image.

The image encoder 370 may obtain the correction data by processing the residual image and the first modified predicted image according to the parameters set through training. The correction data may be transmitted to the generator 1320.

Figure 18:
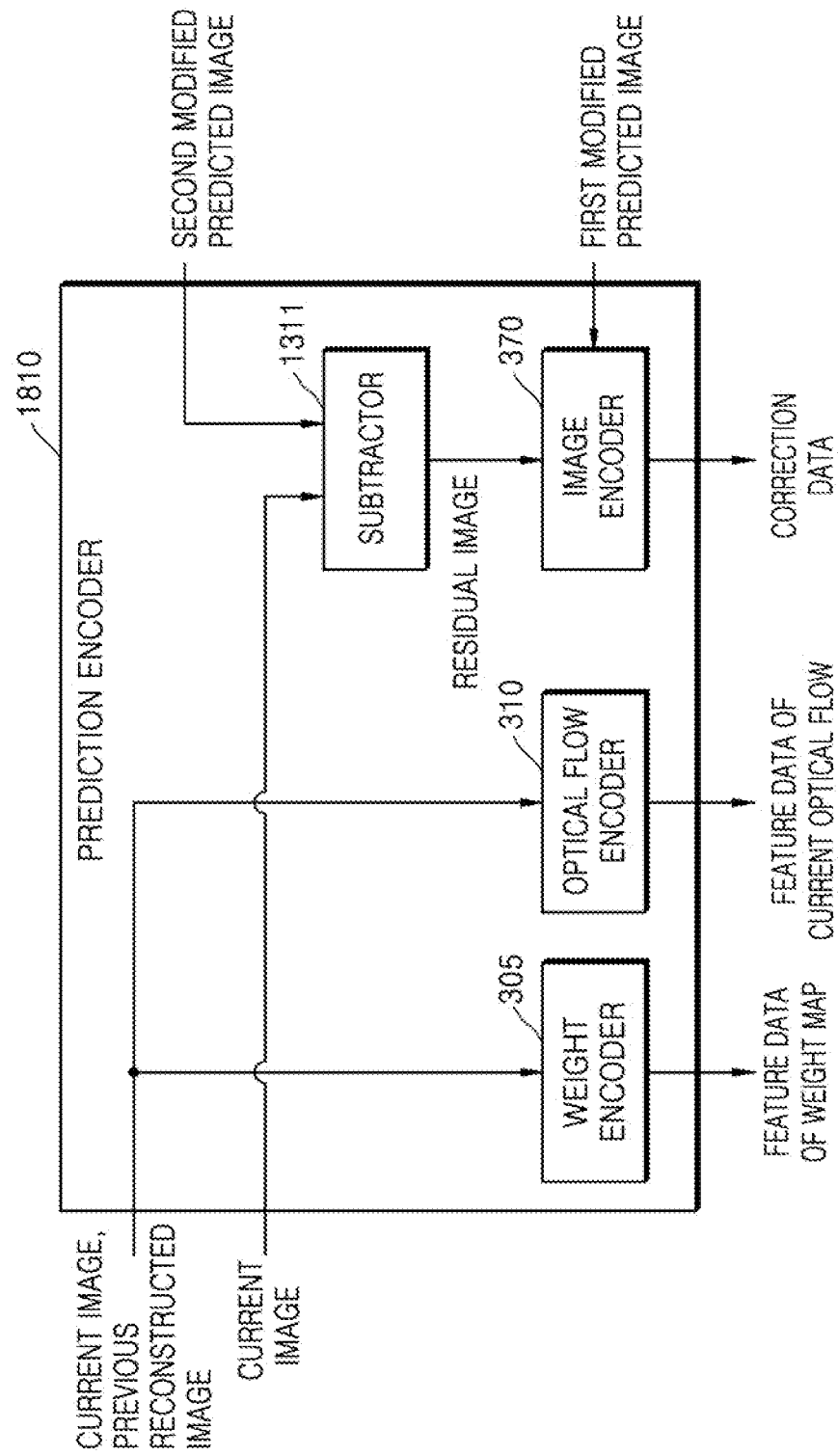
FIG. 18 is a block diagram of a configuration of a prediction encoder according to embodiments.

FIG. 18 is a block diagram of a configuration of a prediction encoder 1810 according to an embodiment of the disclosure.

In embodiments, the prediction encoder 1810 of FIG. 18 may be paired with the prediction decoder 1130 of FIG. 11.

The prediction encoder 1810 may include a weight encoder 305 to generate the feature data of a weight map.

The weight encoder 305 may be implemented as, by, or using a neural network including one or more layers (e.g., a convolutional layer).

The weight encoder 305 may be stored in a memory. According to an embodiment of the disclosure, the weight encoder 305 may be implemented as, by, or using at least one dedicated processor for AI.

The weight encoder 305 may output the feature data of the weight map by processing the current image and the previous reconstructed image according to the parameters set through training. The feature data of the weight map may be included in the bitstream through the generator 1320.

As described above, the prediction decoder 1130 may obtain the first weight map and the second weight map by applying the feature data of the weight map to the weight decoder 335.

The operations of the components of the prediction encoder 1810 shown in FIG. 18 may be the same as, or similar to, those of the components of the prediction encoder 1710 shown in FIG. 17 except for the weight encoder 305, and thus detailed descriptions thereof will be omitted.

Figure 19:
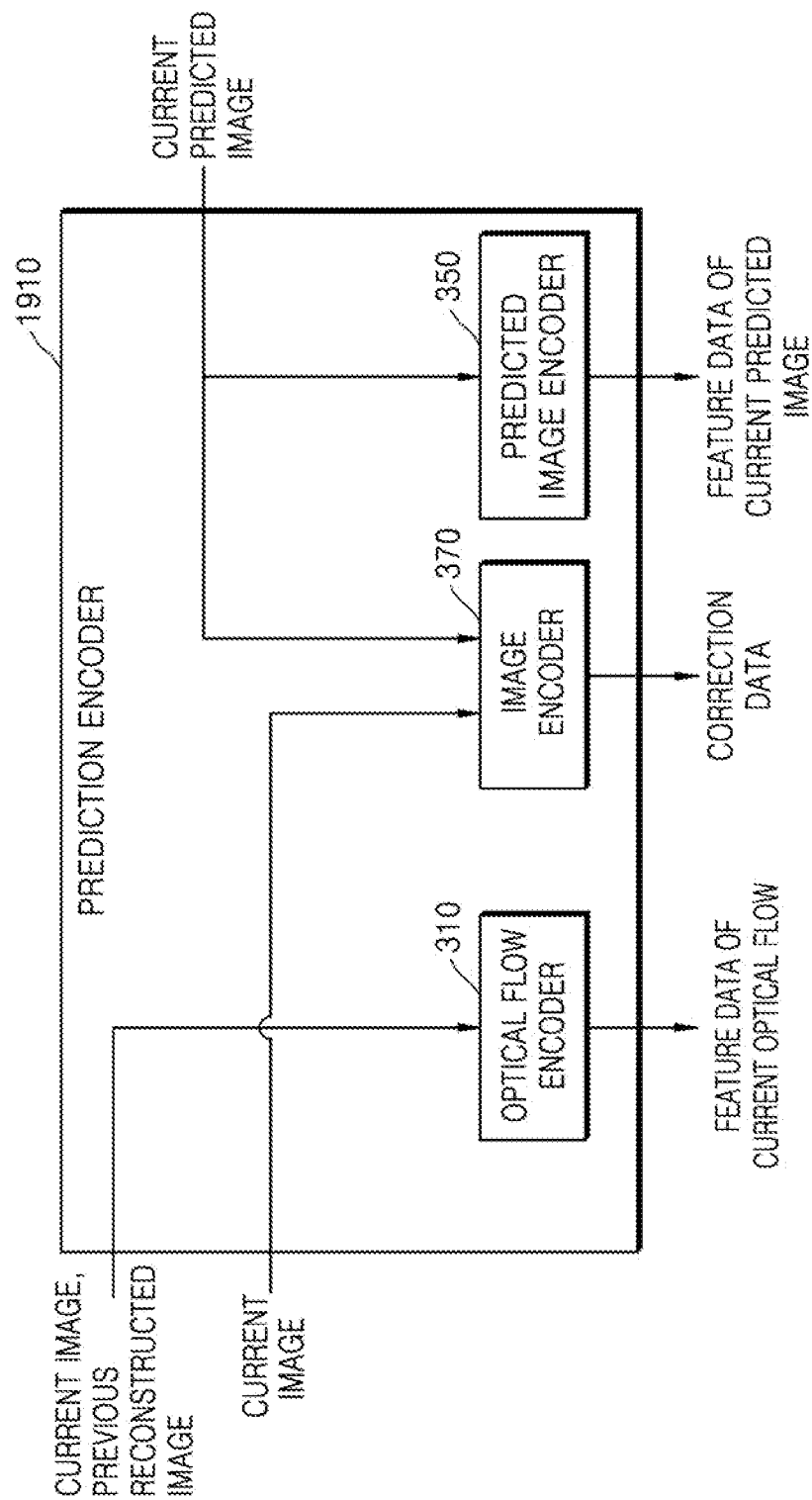
FIG. 19 is a block diagram of a configuration of a prediction encoder according to embodiments.

FIG. 19 is a block diagram of a configuration of a prediction encoder 1910 according to an embodiment of the disclosure.

The prediction encoder 1910 of FIG. 19 may include the optical flow encoder 310, the image encoder 370, and the predicted image encoder 350.

Because the predicted image encoder 350 included in the prediction decoder 630 of FIG. 6, the prediction decoder 830 of FIG. 8, the prediction decoder 930 of FIG. 9, the prediction decoder 1030 of FIG. 10, and the prediction decoder 1130 of FIG. 11 is included in the prediction encoder 1910, the prediction decoder 430 of the image decoding apparatus 400 according to an embodiment of the disclosure may include only the image decoder 390. In other words, the optical flow decoder 330, the motion compensator 431, and the predicted image encoder 350 may be not included in the prediction decoder 430.

Referring to FIG. 19, as the current image and the previous reconstructed image are processed by the optical flow encoder 310, the feature data of the current optical flow may be obtained. The feature data of the current optical flow may be used to generate the current predicted image.

As the current image and the previous predicted image are processed by the image encoder 370, the correction data may be obtained.

Separately from the current predicted image being input to the image encoder 370, the current predicted image may be input to the predicted image encoder 350, and the predicted image encoder 350 may obtain the feature data of the current predicted image by processing the current predicted image.

The feature data of the current predicted image and the correction data may be transmitted to the generator 1320. The generator 1320 may generate a bitstream including the feature data of the current predicted image and the correction data.

According to an embodiment of the disclosure, the feature data of the current optical flow may be not included in the bitstream. The prediction decoder 430 of the image decoding apparatus 400 may obtain the current reconstructed image by inputting the correction data and the feature data of the current predicted image both obtained from the bitstream to the image decoder 390.

Figure 20:
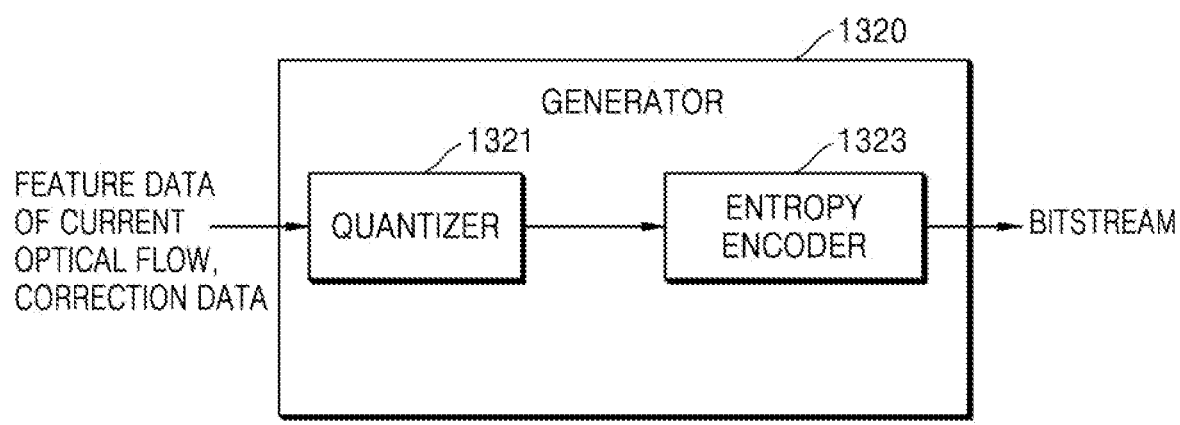
FIG. 20 is a block diagram of a configuration of a generator according to embodiments.

FIG. 20 is a block diagram of a configuration of the generator 1320 according to an embodiment of the disclosure.

Referring to FIG. 20, the generator 1320 may include a quantizer 1321 and an entropy encoder 1323.

The quantizer 1321 may quantize the feature data of the current optical flow and the correction data.

The entropy encoder 1323 may generate the bitstream by entropy-coding the quantized feature data of the current optical flow and the quantized correction data.

According to an embodiment of the disclosure, the generator 1320 may further include a transformer. The transformer may transform the feature data of the current optical flow and the correction data from a spatial domain into a frequency domain, and provide a result of the transformation to the quantizer 1321.

According to an embodiment of the disclosure, the generator 1320 may not include the quantizer 1321. In other words, the bitstream including the feature data of the current optical flow and the correction data may be obtained through processing by the entropy encoder 1323.

According to an embodiment of the disclosure, the generator 1320 may generate the bitstream by binarizing the feature data of the current optical flow and the correction data. In other words, when the generator 1320 performs only binarization, the quantizer 1321 and the entropy encoder 1333 may be not included in the generator 1320.

Figure 21:
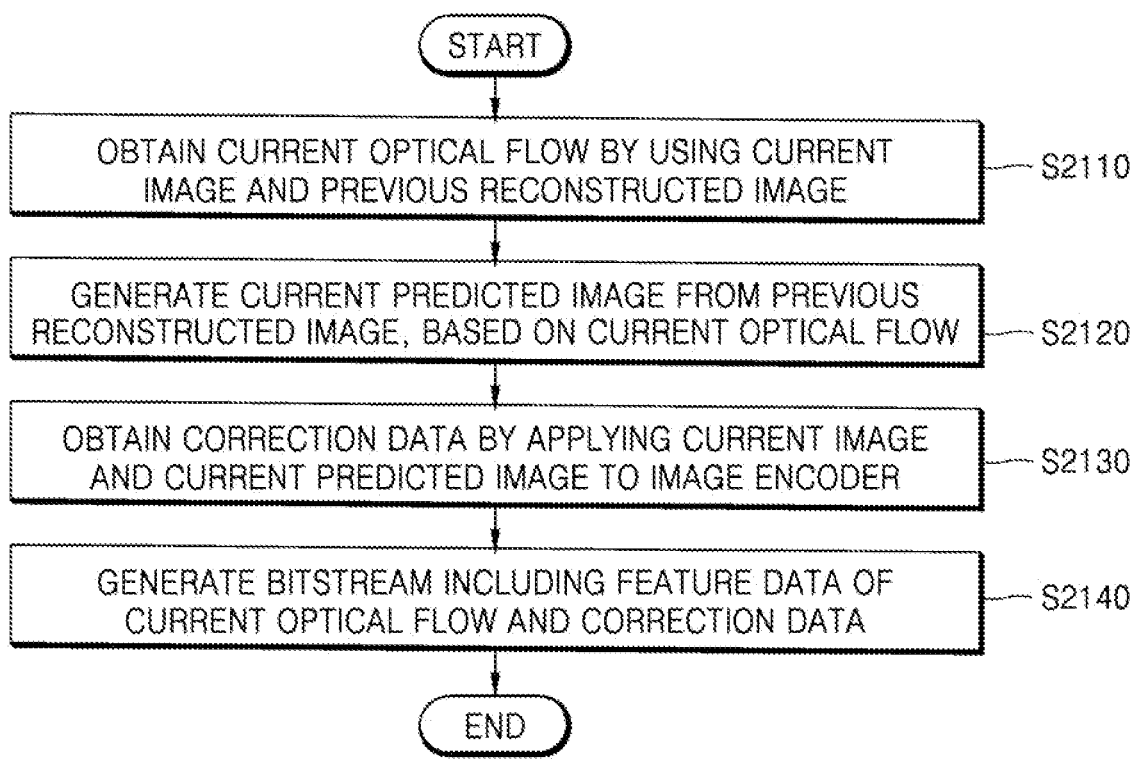
FIG. 21 is a flowchart of an image encoding method according to embodiments.

FIG. 21 is a flowchart of an image encoding method performed by the image encoding apparatus 1300, according to an embodiment of the disclosure.

In operation S2110, the image encoding apparatus 1300 obtains the current optical flow by using the current image and the previous reconstructed image.

According to an embodiment of the disclosure, the image encoding apparatus 1300 may obtain the feature data of the current optical flow by applying the current image and the previous reconstructed image to the optical flow encoder 310, and may obtain the current optical flow by applying the feature data of the current optical flow to the optical flow decoder 330.

In operation S2120, the image encoding apparatus 1300 generates the current predicted image from the previous reconstructed image, based on the current optical flow. Warping may be used to obtain the current predicted image.

In operation S2130, the image encoding apparatus 1300 obtains the correction data by applying the current image and the current predicted image to the image encoder 370.

According to an embodiment of the disclosure, the image encoding apparatus 1300 may obtain the second modified predicted image by applying the second weight map among the first and second weight maps to the current predicted image, and may obtain the residual image by using the correction image and the second modified predicted image. The image encoding apparatus 1300 may obtain the first modified predicted image by applying the first weight map to the current predicted image, and may obtain the correction data by applying the first modified predicted image and the residual image to the image encoder 370.

In operation S2140, the image encoding apparatus 1300 generates the bitstream including the feature data of the current optical flow and the correction data.

According to an embodiment of the disclosure, the image encoding apparatus 1300 may perform at least one of transformation, quantization, or entropy encoding on the feature data of the current optical flow and the correction data in order to generate the bitstream.

According to an embodiment of the disclosure, the image encoding apparatus 1300 may obtain the feature data of the weight map by applying the current image and the previous reconstructed image to the weight encoder 305, and may include the feature data of the weight map in the bitstream.

The processes described above with reference to FIG. 21 may be performed by the image encoding apparatus 1300 including the prediction encoder 1410 of FIG. 14, the prediction encoder 1610 of FIG. 16, the prediction encoder 1710 of FIG. 17, the prediction encoder 1810 of FIG. 18, and the prediction encoder 1910 of FIG. 19.

In embodiments, the image encoding apparatus 1300 including the prediction encoder 1610 of FIG. 16 may perform the processes described above with reference to FIG. 21 when the current predicted image is input to the image encoder 370.

The image encoding apparatus 1300 including the prediction encoder 1510 of FIG. 15 or the prediction encoder 1610 of FIG. 16 (when the current predicted image is input to the subtractor 1311) may obtain the residual image by using the current image and the current predicted image, and may obtain the correction data by applying the residual image to the image encoder 370.

The configuration and operation of the prediction decoder 430 according to an embodiment of the disclosure have been described above with reference to FIGS. 6 through 11, and the configuration and operation of the prediction encoder 1310 according to an embodiment of the disclosure have been described above with reference to FIGS. 14 through 19.

According to an embodiment of the disclosure, when the image decoding apparatus 400 includes any one of the prediction decoders 630, 730, 830, 930, and 1030 of FIGS. 6, 7, 8, 9, and 10, the image encoding apparatus 1300 of FIGS. 14 through 17 may include any one of the prediction encoders 1410, 1510, 1610, and 1710 of FIGS. 14, 15, 16, and 17. This is because information used by the prediction decoders 630, 730, 830, 930, and 1030 of FIGS. 6 through 10 to reconstruct the current image may correspond to the feature data of the current optical flow and the correction data and the prediction encoders 1410, 1510, 1610, and 1710 of FIGS. 14 through 17 output the feature data of the current optical flow and the correction data.

According to an embodiment of the disclosure, when the image decoding apparatus 400 includes the prediction decoder 930 of FIG. 9 or the prediction decoder 1030 of FIG. 10 using the first modified predicted image and the second modified predicted image, the image encoding apparatus 1300 may include the prediction encoder 1710 of FIG. 17 using the first modified predicted image and the second modified predicted image.

According to an embodiment of the disclosure, when the image decoding apparatus 400 includes the prediction decoder 1130 of FIG. 11, the image encoding apparatus 1300 may include the prediction encoder 1810 of FIG. 18. This is because the feature data of the weight map required by the prediction decoder 1130 of FIG. 11 is output by the prediction encoder 1810 of FIG. 18.

According to an embodiment of the disclosure, when the image encoding apparatus 1300 includes the prediction encoder 1910 of FIG. 19, the image decoding apparatus 400 may include the prediction decoder 430 including only the image decoder 390.

At least one of the optical flow encoder 310, the image encoder 370, the optical flow decoder 330, the image decoder 390, the predicted image encoder 350, the weight encoder 305, or the weight decoder 335 may include at least one convolutional layer.

An example of a structure that at least one of the optical flow encoder 310, the image encoder 370, the optical flow decoder 330, the image decoder 390, the predicted image encoder 350, the weight encoder 305, or the weight decoder 335 may have, is described below with reference to FIG. 22.

Figure 22:
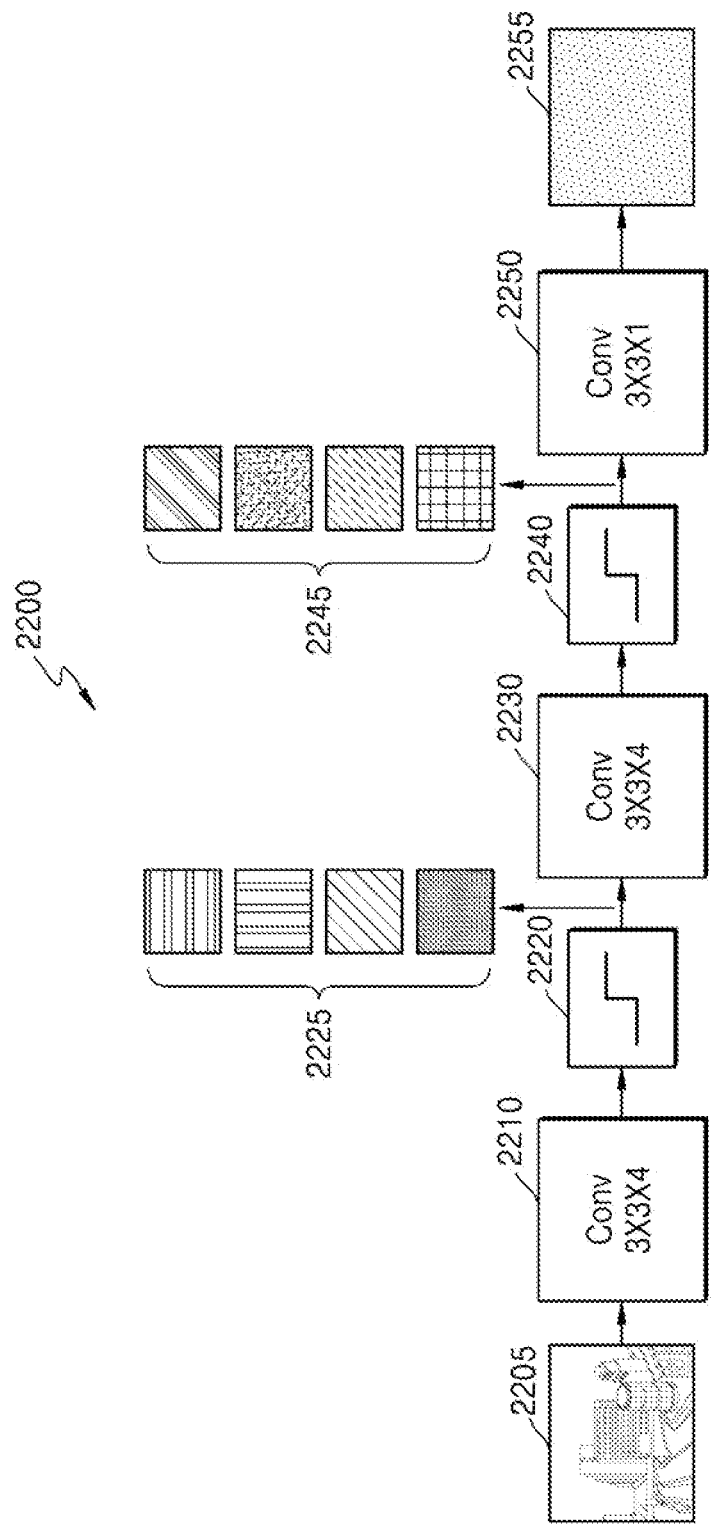
FIG. 22 is a diagram illustrating a structure of a neural network according to embodiments.

FIG. 22 is a diagram illustrating a structure of a neural network 2200 according to an embodiment of the disclosure.

As shown in FIG. 22, input data 2205 is input to a first convolutional layer 2210. The input data 2205 varies according to whether the neural network 2200 serves as the optical flow encoder 310, the image encoder 370, the optical flow decoder 330, the image decoder 390, the predicted image encoder 350, the weight encoder 305, or the weight decoder 335.

According to an embodiment of the disclosure, when the neural network 2200 serves as the optical flow encoder 310, the input data 2205 may be a current image and a previous reconstructed image, and, when the neural network 2200 is the predicted image encoder 350, the input data 2205 may be a current predicted image or a first modified predicted image.

The indication 3×3×4 marked on the first convolutional layer 2210 of FIG. 22 indicates that convolution is performed on one piece of input data 2205 by using four filter kernels having a 3×3 size. Four feature maps are generated by the four filter kernels as a result of the convolution.

The feature maps generated by the first convolutional layer 2210 represent unique features of the input data 2205. For example, each feature map may represent vertical direction characteristics, horizontal direction characteristics, or edge characteristics of the input data 2205.

An example of a convolution operation in the first convolutional layer 2210 is described below in detail with reference to FIG. 23.

A single feature map 2350 may be generated through multiplication and addition between parameters of a filter kernel 2330 having a size of 3×3 used in the first convolutional layer 2210 and sample values in the input data 2205 corresponding to the parameters. Because four filter kernels 2330 are used in the first convolutional layer 2210, four feature maps 2350 may be generated through a convolution operation using the four filter kernels 2330.

Figure 23:
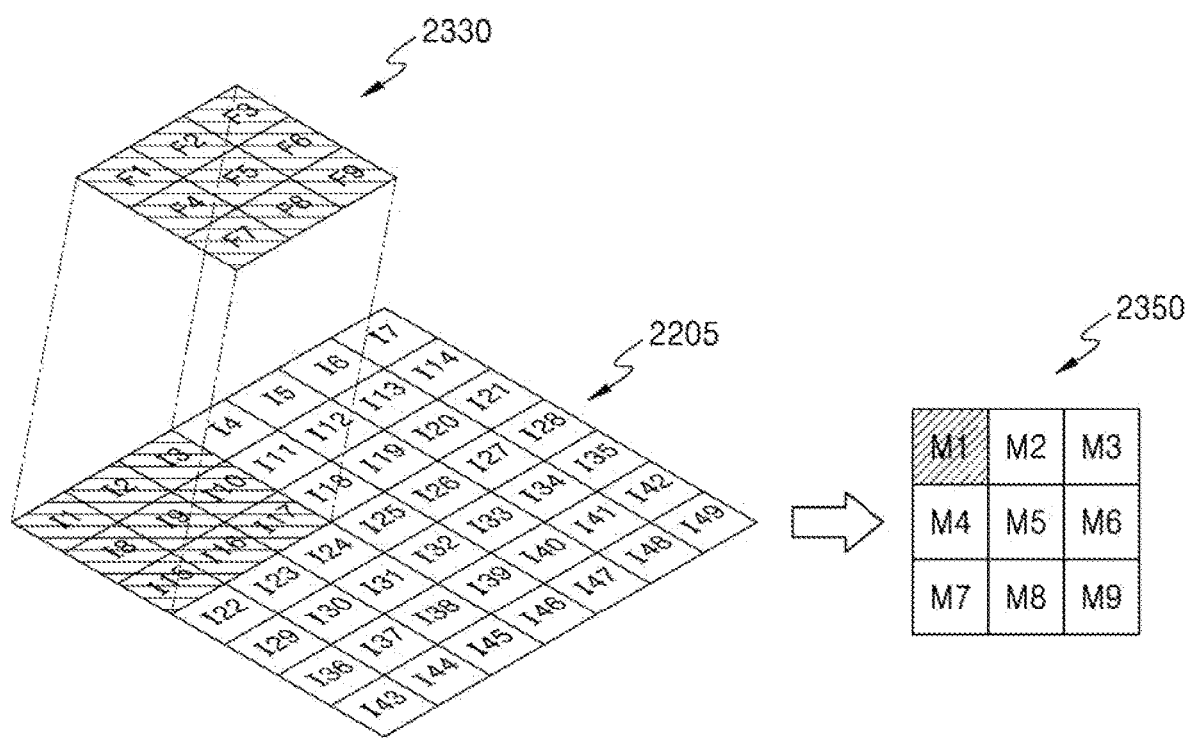
FIG. 23 is a view for describing a convolution operation performed at a convolutional layer, according to embodiments.

In FIG. 23, I1 through I49 marked on the first image 2205 indicate samples of the input data 2205, and F1 through F9 marked on the filter kernel 2330 indicate samples, which may be referred to as parameters, of the filter kernel 2330. M1 through M9 marked on the feature map 2350 indicate samples of the feature map 2350.

In the convolution operation, multiplication between sample values of I1, I2, I3, I8, I9, I10, I15, I16, and I17 of the input data 2205 and F1, F2, F3, F4, F5, F6, F7, F8 and F9 of the filter kernel 2330 may be respectively performed, and a value obtained by combining, for example using addition, of resultant values of the multiplication may be allocated as the value of M1 of the feature map 2350. When the stride of the convolution operation is 2, multiplication between sample values of I3, I4, I5, I10, I11, I12, I17, I18, and I19 of the input data 2205, and F1, F2, F3, F4, F5, F6, F7, F8 and F9 of the filter kernel 2330 may be respectively performed, and a value obtained by combining resultant values of the multiplication may be allocated as the value of M2 of the feature map 2350.

While the filter kernel 2330 is moving according to the stride until reaching a last sample of the input data 2205, the convolution operation between the sample values within the input data 2205 and the samples of the filter kernel 2330 may be performed, and thus the feature map 2350 having a certain size may be obtained.

According to the disclosure, values of the parameters of the neural network 2200, for example, the samples of the filter kernel 2330 used in the convolutional layers of the neural network 2200 (e.g., F1, F2, F3, F4, F5, F6, F7, F8 and F9 of the filter kernel 2330) may be optimized through training of the neural network 2200.

The convolutional layers included in the neural network 2200 may perform the convolution operation of FIG. 23, but the convolution operation of FIG. 23 is only an example. Embodiments are not limited thereto.

Referring back to FIG. 22, the feature maps of the first convolutional layer 2210 are input to a first activation layer 2220.

The first activation layer 2220 may impart non-linear characteristics to each of the feature maps. The first activation layer 2220 may include, but is not limited to, a sigmoid function, a Tanh function, a Rectified Linear Unit (ReLU) function, and the like.

The first activation layer 2220 imparting non-linear characteristics may refer to changing and outputting some sample values of the feature maps. This change may be performed using the non-linear characteristics.

The first activation layer 2220 determines whether to transmit the sample values of the feature maps to a second convolutional layer 2230. For example, some of the sample values of the feature maps are activated by the first activation layer 2220 and transmitted to the second convolutional layer 2230, and some other sample values are not activated by the first activation layer 2220 and not transmitted to the second convolutional layer 2230. Unique characteristics of the input data 2205 indicated by the feature maps are emphasized by the first activation layer 2220.

Feature maps 2225 output by the first activation layer 2220 are input to the second convolutional layer 2230. One of the feature maps 2225 of FIG. 22 is a result obtained by processing the feature map 2350 of FIG. 23 in the first activation layer 2220.

The indication 3×3×4 marked on the second convolutional layer 2230 indicates that convolution is performed on the input feature maps 2225 by using four filter kernels having a 3×3 size. An output of the second convolutional layer 2230 is input to a second activation layer 2240. The second activation layer 2240 may impart non-linear characteristics to input feature maps.

Feature maps 2245 output by the second activation layer 2240 are input to a third activation layer 2250. The indication 3×3×1 marked on the third convolutional layer 2250 indicates that convolution is performed to create one piece of output data 2255 by using one filter kernel having a 3×3 size.

The output data 2255 varies according to whether the neural network 2200 serves as the optical flow encoder 310, the image encoder 370, the optical flow decoder 330, the image decoder 390, the predicted image encoder 350, the weight encoder 305, or the weight decoder 335.

For example, when the neural network 2200 serves as the image encoder 370, the output data 2255 may be correction data, and, when the neural network 2200 serves as the weight encoder 305, the output data 2255 may be feature data of a weight map.

Although the neural network 2200 is illustrated as including three convolutional layers and two activation layers in FIG. 22, this is merely an example. According to an embodiment of the disclosure, the number of convolutional layers and activation layers included in the neural network 2200 may vary in various ways.

According to an embodiment of the disclosure, the neural network 2200 may be implemented as, by, or using a recurrent neural network (RNN). This case may refer to changing a CNN structure of the neural network 2200 according to an embodiment of the disclosure to an RNN structure.

According to an embodiment of the disclosure, the image decoding apparatus 400 and the image encoding apparatus 1300 may include at least one arithmetic logic unit (ALU) for the above-described convolution operation and an operation of an activation layer.

The ALU may be implemented as, by, or using a processor. For the convolution operation, the ALU may include a multiplier for multiplying the sample values of the input data 2205 or the sample values of a feature map output by a previous layer by the sample values of a filter kernel, and an adder for adding resultant values of the multiplication.

For the operation of the activation layer, the ALU may include a multiplier for multiplying an input sample value by a weight used in a pre-determined sigmoid function, Tanh function, or ReLU function, and a comparator for comparing a result of the multiplication with a certain value to determine whether to transmit an input sample value to a next layer.

An example of a method of training neural networks used in an image encoding and decoding process is described below with reference to FIGS. 24 and 25.

Figure 24:
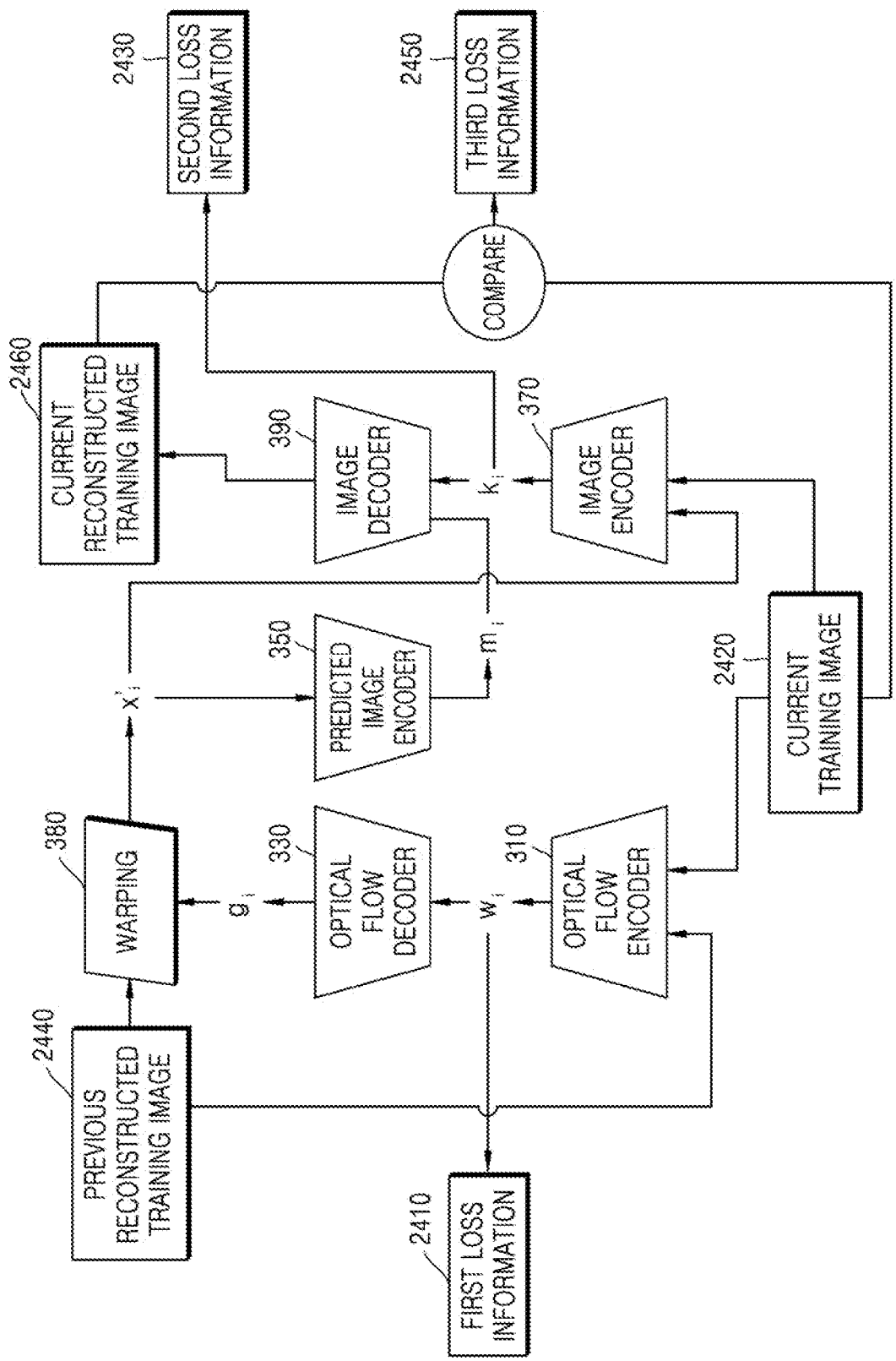
FIG. 24 is a diagram for describing a method of training an optical flow encoder, an optical flow decoder, a predicted image encoder, an image encoder, and an image decoder, according to embodiments.

FIG. 24 is a diagram for describing a method of training the optical flow encoder 310, the image encoder 370, the optical flow decoder 330, the image decoder 390, and the predicted image encoder 350.

The training method described with reference to FIG. 24 may be performed for a case where the image decoding apparatus 400 includes the prediction decoder 630 of FIG. 6 and the image encoding apparatus 1300 includes the prediction encoder 1410 of FIG. 14.

According to an embodiment of the disclosure, a training method of neural networks for a case in which the image decoding apparatus 400 includes any one of the prediction decoder 730 of FIG. 7, the prediction decoder 830 of FIG. 8, the prediction decoder 930 of FIG. 9, the prediction decoder 1030 of FIG. 10, and the prediction decoder 1130 of FIG. 11, and the image encoding apparatus 1300 includes any one of the prediction encoder 1510 of FIG. 15, the prediction encoder 1610 of FIG. 16, the prediction encoder 1710 of FIG. 17, the prediction encoder 1810 of FIG. 18, and the prediction encoder 1910 of FIG. 19 may be substantially the same as the training method described below with reference to FIG. 24.

For example, when the image decoding apparatus 400 includes the prediction decoder 630 of FIG. 6 and the image encoding apparatus 1300 includes the prediction encoder 1510 of FIG. 15, neural networks may be trained in FIG. 24 by changing inputting of a current training image 2420 and a current predicted training image $x'_i$ to the image encoder 370 to inputting of a residual image between the current training image 2420 and the current predicted training image $x'_i$ to the image encoder 370.

For example, when the image decoding apparatus 400 includes the prediction decoder 730 of FIG. 7 and the image encoding apparatus 1300 includes the prediction encoder 1410 of FIG. 14, neural networks may be trained in FIG. 24 by excluding the predicted image encoder 350 and changing inputting of feature data of the current predicted training image $x'_i$ to the image decoder 390 to combination of the current predicted training image $x'_i$ with an output image of the image decoder 390.

In other words, when the image decoding apparatus 400 includes any one of the prediction decoders 730, 830, 930, 1030, and 1130 of FIGS. 7 through 11 and the image encoding apparatus 1300 includes any one of the prediction encoders 1510, 1610, 1710, 1810, and 1910 of FIGS. 15 through 19, neural networks may be trained by changing the flow of input/output data shown in FIG. 24 and adding the weight encoder 305, the weight decoder 335, or the weight applier 439.

In FIG. 24, the current training image 2420, a previous reconstructed training image 2440, and a current reconstructed training image 2460 correspond to the aforementioned current image, the aforementioned previous reconstructed image, and the aforementioned current reconstructed image, respectively.

When the optical flow encoder 310, the image encoder 370, the optical flow decoder 330, the image decoder 390, and the predicted image encoder 350 are trained, a similarity between the current reconstructed training image 2460 and the current training image 2420 and a bit rate of a bitstream to be generated by encoding the current training image 2420 need to be considered.

To this end, according to an embodiment of the disclosure, the optical flow encoder 310, the image encoder 370, the optical flow decoder 330, the image decoder 390, and the predicted image encoder 350 may be trained according to first loss information 2410 and second loss information 2430 corresponding to a size of the bitstream and third loss information 2450 corresponding to the similarity between the current training image 2420 and the current reconstructed training image 2460.

Referring to FIG. 24, the current training image 2420 and the previous reconstructed training image 2440 may be input to the optical flow encoder 310. The optical flow encoder 310 may output feature data $w_i$ of a current optical flow by processing the current training image 2420 and the previous reconstructed training image 2440.

The feature data $w_i$ of the current optical flow may be input to the optical flow decoder 330, and the optical flow decoder 330 may output a current optical flow $g_i$ by processing the feature data $w_i$ of the current optical flow.

When the previous reconstructed training image 2440 is warped by the warping 380 according to the current optical flow $g_i$, the current predicted training image $x'_i$ may be generated and may be input to the predicted image encoder 350.

The predicted image encoder 350 may output feature data $m_i$ of the current predicted training image $x'_i$ by processing the current predicted training image $x'_i$.

The current training image 2420 and the current predicted training image $x'_i$ may be input to the image encoder 370, and the image encoder 370 may output correction data $k_i$ by processing the current training image 2420 and the current predicted training image $x'_i$.

The image decoder 390 may obtain the current reconstructed training image 2460 by processing the feature data $m_i$ of the current predicted training image $x'_i$ and the correction data $k_i$.

According to an embodiment of the disclosure, the feature data $w_i$ of the current optical flow may be further input to the image decoder 390.

In order to train the optical flow encoder 310, the image encoder 370, the optical flow decoder 330, the image decoder 390, and the predicted image encoder 350, at least one of the first loss information 2410, the second loss information 2430, or the third loss information 2450 may be obtained.

The first loss information 2410 may be calculated from entropy of the feature data $w_i$ of the current optical flow or a bit rate of a bitstream corresponding to the feature data $w_i$ of the current optical flow.

The second loss information 2430 may be calculated from entropy of the correction data $k_i$ or a bit rate of a bitstream corresponding to the correction data kl.

According to an embodiment of the disclosure, when the feature data of the weight map is output by the weight encoder 305, fourth loss information may be calculated from a bit rate of a bitstream corresponding to the feature data of the weight map.

Because the first loss information 2410 and the second loss information 2430 are related to the efficiency of encoding the current training image 2420, the first loss information 2410 and the second loss information 2430 may be referred to as compression loss information.

According to an embodiment of the disclosure, although the first loss information 2410 and the second loss information 2430 related to the bitrate of a bitstream are derived in FIG. 24, one piece of loss information corresponding to the bitrate of one bitstream generated through encoding of the current training image 2420 may be derived.

The third loss information 2450 may correspond to a difference between the current training image 2420 and the current reconstructed training image 2460. The difference between the current training image 2420 and the current reconstructed training image 2460 may include at least one of a L1-norm value, an L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value, or a Video Multimethod Assessment Fusion (VMAF) value between current training image 2420 and the current reconstructed training image 2460.

Because the third loss information 2450 is related to the quality of the current reconstructed training image 2460, the third loss information 2450 may be referred to as quality loss information.

The optical flow encoder 310, the image encoder 370, the optical flow decoder 330, the image decoder 390, and the predicted image encoder 350 may be trained to reduce or minimize final loss information derived from at least one of the first loss information 2410, the second loss information 2430, or the third loss information 2450.

For example, the optical flow encoder 310, the image encoder 370, the optical flow decoder 330, the image decoder 390, and the predicted image encoder 350 may be trained to reduce or minimize final loss information by changing values of pre-set parameters.

According to an embodiment of the disclosure, the final loss information may be calculated according to Equation 2 below.

final loss information=$a$*first loss information+$b$*second loss information+$c$*third loss information (Equation 2)

In Equation 2, a represents a weight that is applied to the first loss information 2410, b represents a weight that is applied to the second loss information 2430, and c represents a weight that is applied to the third loss information 2450.

According to Equation 2, it is found that the optical flow encoder 310, the image encoder 370, the optical flow decoder 330, the image decoder 390, and the predicted image encoder 350 may be trained so that the current reconstructed training image 2460 is as similar as possible to the current training image 2420 and a size of a bitstream corresponding to data output from the optical flow encoder 310 and the image encoder 370 is minimized.

When c is 1 in Equation 2 and one piece of loss information corresponding to the bitrate of one bitstream generated through encoding of the current training image 2420 is derived, final loss information may be derived using Equation 3 below.

final loss information=$k$*first loss information+second loss information (Equation 3)

In Equation 3, the first loss information may be derived from the bitrate of the one bitstream generated through encoding of the current training image 2420, and the second loss information may be derived from a difference between the current training image 2420 and the current reconstructed training image 2460.

The final loss information derived according to Equation 3 corresponds to the rate-distortion value of Equation 1. In other words, the optical flow encoder 310, the image encoder 370, the optical flow decoder 330, the image decoder 390, and the predicted image encoder 350 may be trained to minimize the rate-distortion value.

Figure 25:
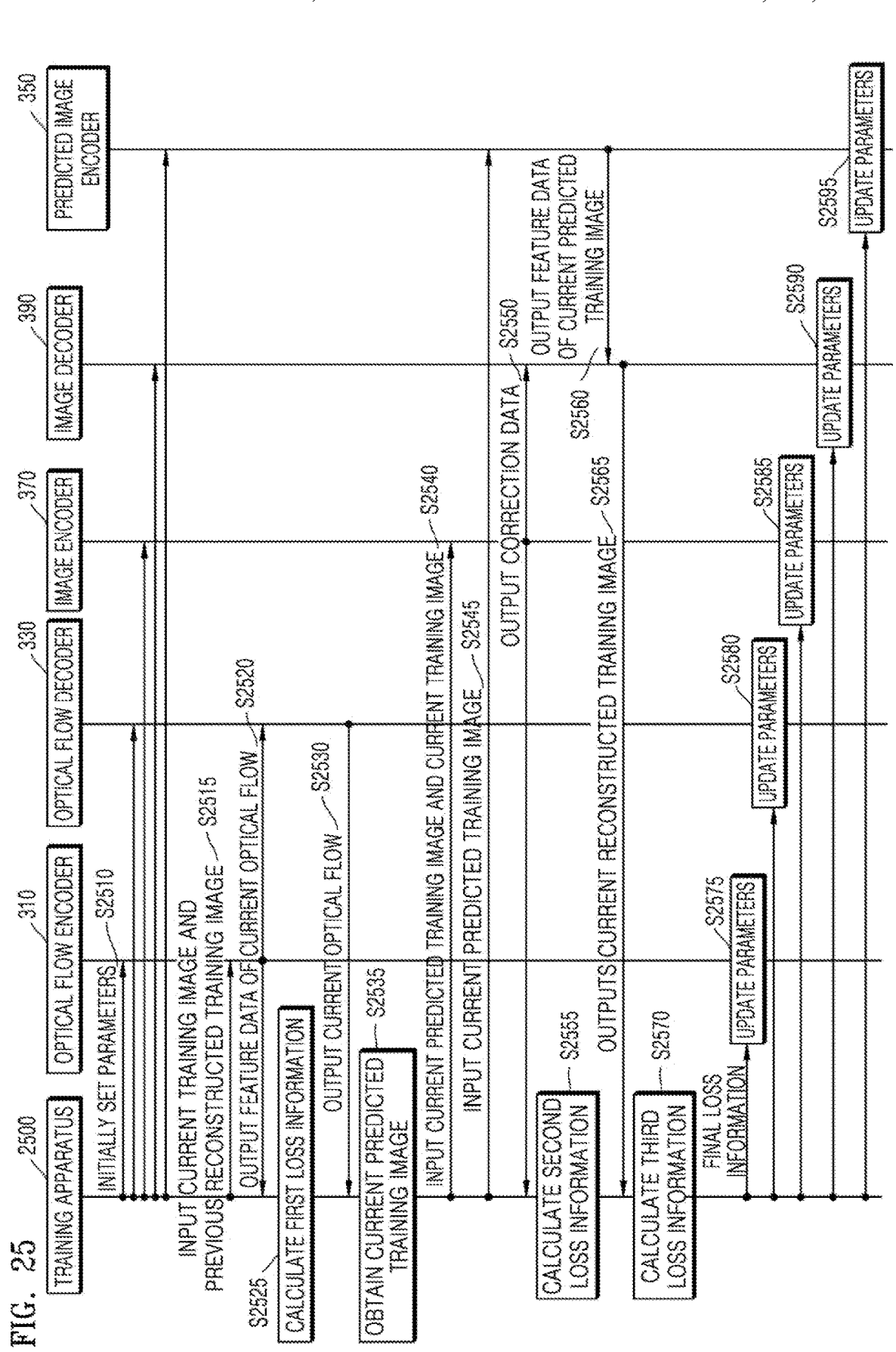
FIG. 25 is a diagram for describing a process, performed by a training apparatus, of training an optical flow encoder, an optical flow decoder, a predicted image encoder, an image encoder, and an image decoder, according to embodiments.

FIG. 25 is a diagram for describing a process, performed by a training apparatus 2500, of training the optical flow encoder 310, the image encoder 370, the optical flow decoder 330, the image decoder 390, and the predicted image encoder 350.

The training described above with reference to FIG. 24 may be performed by the training apparatus 2500. The training apparatus 2500 may be, for example, the image encoding apparatus 1300 or a separate server. Parameters obtained as a result of training may be stored in the image encoding apparatus 1300 and the image decoding apparatus 400.

Referring to FIG. 25, the training apparatus 2500 initially sets parameters of the optical flow encoder 310, the image encoder 370, the optical flow decoder 330, the image decoder 390, and the predicted image encoder 350, at operation S2510. Accordingly, the optical flow encoder 310, the image encoder 370, the optical flow decoder 330, the image decoder 390, and the predicted image encoder 350 may operate according to the initially set parameters.

The training apparatus 2500 may input the current training image 2420 and the previous reconstructed training image 2440 to the optical flow encoder 310, at operation S2515.

The optical flow encoder 310 may output the feature data $w_i$ of the current optical flow to the training apparatus 2500 and the optical flow decoder 330 by processing the current training image 2420 and the previous reconstructed training image 2440, at operation S2520.

The training apparatus 2500 may calculate the first loss information 2410 from the feature data $w_i$ of the current optical flow, at operation S2525.

The optical flow decoder 330 may output the current optical flow $g_i$ to the training apparatus 2500 by processing the feature data $w_i$ of the current optical flow, at operation S2530.

The training apparatus 2500 may generate the current predicted training image $x'_i$ by using the current optical flow $g_i$, at operation S2535, and input current predicted training image $x'_i$ and the current training image 2420 to the image encoder 370, at operation S2540. The training apparatus 2500 may input the current predicted training image $x'_i$ to the predicted image encoder 350, at operation S2545.

The image encoder 370 may process current predicted training image $x'_i$ and the current training image 2420 to output the correction data $k_i$ to the training apparatus 2500 and the image decoder 390, at operation S2550.

The training apparatus 2500 may calculate the second loss information 2430 from the correction data $k_i$, at operation S2555.

The predicted image encoder 390 may output the feature data $m_i$ of the current predicted training image $x'_i$ to the image decoder 390, at operation S2560.

The image decoder 390 may obtain the current reconstructed training image 2460 by processing the feature data $m_i$ of the current predicted training image $x'_i$ and the correction data $k_i$, and output the current reconstructed training image 2460 to the training apparatus 2500, at operation S2565.

The training apparatus 2500 may calculate the third loss information 2450 corresponding to a difference between the current training image 2420 and the current reconstructed training image 2460, at operation S2570.

The training apparatus 2500 may calculate final loss information by combining at least one of the first loss information 2410, the second loss information 2430, or the third loss information 2450, and the optical flow encoder 310, the optical flow decoder 330, the image encoder 370, the image decoder 390, and the predicted image encoder 350 update the initially set parameters through back propagation based on the final loss information, at operations S2575, S2580, S2585, S2590, and S2595.

Next, the optical flow encoder 310, the optical flow decoder 330, the image encoder 370, the image decoder 390, and the predicted image encoder 350 may update the parameters by repeatedly performing operations S2515 through S2595 until the final loss information is minimized. In this case, the optical flow encoder 310, the optical flow decoder 330, the image encoder 370, the image decoder 390, and the predicted image encoder 350 operate according to the parameters updated in a previous process.

The above-described embodiments of the disclosure can be written as computer-executable programs, and the written computer-executable programs can be stored in a machine-readable storage medium.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory recording medium may include a buffer in which data is temporarily stored.

According to an embodiment of the disclosure, a method according to various disclosed embodiments may be provided by being included in a computer program product. The computer program product, which may be a commodity, may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While one or more embodiments of the disclosure have been described with reference to the figures, it will be understood by those of ordinary skill in the art that various changes in form and details may be made therein without departing from the spirit and scope as defined by the following claims.

The invention claimed is:

1. An image decoding method using artificial intelligence (AI), the image decoding method comprising:
    obtaining, from a bitstream, a current optical flow and correction data which are generated based on a current predicted image and a current image;
    obtaining the current predicted image based on a previous reconstructed image and the current optical flow;
    obtaining feature data of the current predicted image by applying the current predicted image to a neural network-based predicted image encoder; and
    obtaining a current reconstructed image corresponding to the current image by applying the correction data and the feature data of the current predicted image to a neural network-based image decoder.

2. The image decoding method of claim 1, wherein the feature data of the current predicted image is generated by the predicted image encoder based on a common feature included in the current image and the current predicted image, and
    wherein the common feature does not include high-frequency errors included in the current predicted image.

3. The image decoding method of claim 1, wherein the correction data is generated based on a feature which is included in the current image and which is not included in the current predicted image, by applying the current image and the current predicted image to a neural network-based image encoder.

4. The image decoding method of claim 1, wherein the current optical flow is obtained by applying feature data of the current optical flow obtained from the bitstream to a neural network-based optical flow decoder.

5. The image decoding method of claim 1, further comprising:
    obtaining a first modified predicted image by applying a first weight map to the current predicted image; and
    obtaining a second modified predicted image by applying a second weight map to the current predicted image,
    wherein the obtaining of the feature data of the current predicted image comprises obtaining feature data of the first modified predicted image by applying the first modified predicted image to the predicted image encoder, and
    wherein the obtaining of the current reconstructed image comprises:
        applying the correction data and the feature data of the first modified predicted image to the image decoder; and
        obtaining the current reconstructed image by combining an image obtained from the image decoder with the second modified predicted image.

6. The image decoding method of claim 5, wherein the first weight map and the second weight map are obtained by applying feature data of the current optical flow obtained from the bitstream to a neural network-based optical flow decoder.

7. The image decoding method of claim 5, wherein the first weight map and the second weight map are obtained by applying feature data of the current optical flow to a neural network-based weight decoder.

8. The image decoding method of claim 5, wherein the first weight map and the second weight map are obtained by applying feature data of a weight map obtained from the bitstream to a neural network-based weight decoder.

9. The image decoding method of claim 1, further comprising determining a decoding mode of the current image, based on information obtained from the bitstream,
    wherein based on the decoding mode being a first mode, the current reconstructed image is obtained by applying the correction data and the feature data of the current predicted image to the image decoder, and
    wherein based on the decoding mode being a second mode, the current reconstructed image is obtained by combining an image obtained by applying the correction data to the image decoder with the current predicted image.

10. The image decoding method of claim 9, wherein the information obtained from the bitstream comprises at least one of a quantization parameter, a weight used to calculate a rate-distortion value, or information indicating the decoding mode.

11. A non-transitory computer-readable recording medium having recorded thereon instructions which, when executed by at least one processor, performs the method of claim 1.

12. An image encoding method using artificial intelligence (AI), the image encoding method comprising:
    obtaining a current optical flow using a current image and a previous reconstructed image;
    generating a current predicted image based on the previous reconstructed image and the current optical flow;

obtaining correction data by applying the current image and the current predicted image to a neural network-based image encoder; and generating a bitstream including feature data of the current optical flow and the correction data.

13. The image encoding method of claim 12, further comprising determining an encoding mode corresponding to the current image, wherein based on the encoding mode being a first mode, the correction data is obtained by applying the current image and the current predicted image to the image encoder, and wherein based on the encoding mode being a second mode, the correction data is obtained by applying a residual image obtained based on the current image and the current predicted image to the image encoder.

14. The image encoding method of claim 13, wherein a mode corresponding to a lower rate-distortion value from among a rate-distortion value of the first mode and a rate-distortion value of second mode is determined as the encoding mode.

15. The image encoding method of claim 13, wherein the encoding mode is determined as the first mode or the second mode according to a result of comparing a bitrate of a bitstream obtained according to the first mode and a bitrate of a bitstream obtained according to the second mode.

16. The image encoding method of claim 13, wherein the encoding mode is determined as the first mode or the second mode according to a result of comparing a pre-determined value with a quantization parameter or a weight used to calculate a rate-distortion value.

17. The image encoding method of claim 12, wherein the obtaining of the current optical flow comprises:

obtaining feature data of the current optical flow by applying the current image and the previous reconstructed image to a neural network-based optical flow encoder; and applying the feature data of the current optical flow to a neural network-based optical flow decoder.

18. The image encoding method of claim 12, further comprising:

obtaining a first modified predicted image by applying a first weight map to the current predicted image; and obtaining a second modified predicted image by applying a second weight map to the current predicted image, and wherein the correction data is obtained based on a residual image obtained based on the second modified predicted image and the current image, and the first modified predicted image being applied to the image encoder.

19. A non-transitory computer-readable recording medium having recorded thereon a instructions which, when executed by at least one processor, performs the method of claim 12.

20. An image decoding apparatus using artificial intelligence (AI), the image decoding apparatus comprising:

at least one processor configured to:

obtain, from a bitstream, a current optical flow and correction data which are generated based on a current predicted image and a current image, obtain the current predicted image based on a previous reconstructed image and the current optical flow, obtain feature data of the current predicted image by applying the current predicted image to a neural network-based predicted image encoder, and obtain a current reconstructed image corresponding to the current image by applying the correction data and the feature data of the current predicted image to a neural network-based image decoder.

* * * * *